United States Patent
Luo et al.

(10) Patent No.: US 12,242,700 B2
(45) Date of Patent: Mar. 4, 2025

(54) TOUCH STRUCTURE, DISPLAY PANEL AND DISPLAY APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Chang Luo, Beijing (CN); Shun Zhang, Beijing (CN); Yi Zhang, Beijing (CN); Yuanqi Zhang, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/262,431

(22) PCT Filed: Jun. 30, 2022

(86) PCT No.: PCT/CN2022/102903
§ 371 (c)(1),
(2) Date: Jul. 21, 2023

(87) PCT Pub. No.: WO2024/000436
PCT Pub. Date: Jan. 4, 2024

(65) Prior Publication Data
US 2024/0411412 A1   Dec. 12, 2024

(51) Int. Cl.
*G06F 3/044* (2006.01)

(52) U.S. Cl.
CPC ......... *G06F 3/0446* (2019.05); *G06F 3/0445* (2019.05); *G06F 2203/04111* (2013.01); *G06F 2203/04112* (2013.01)

(58) Field of Classification Search
CPC ................. G06F 3/0446; G06F 3/0445; G06F 2203/04111; G06F 2203/04112
See application file for complete search history.

(56) References Cited

U.S. PATENT DOCUMENTS

| | | | |
|---|---|---|---|
| 11,842,019 B2* | 12/2023 | Wang | G06F 3/0443 |
| 12,008,179 B2* | 6/2024 | Fan | G06F 3/0445 |
| 2019/0079622 A1* | 3/2019 | Choi | G06F 3/047 |

(Continued)

*Primary Examiner* — Mihir K Rayan
(74) *Attorney, Agent, or Firm* — Dority & Manning, P.A.

(57) ABSTRACT

A touch structure includes: a first conductive layer, an insulating layer and a second conductive layer that are sequentially stacked. The second conductive layer includes touch electrodes and touch lines. The touch structure includes: a first connection line and two second connection lines that are located in the second conductive layer, and a connection pattern located in the first conductive layer. The two second connection lines are arranged at two sides of the first connection line, respectively. The connection pattern crosses the first connection line, and passes through the insulating layer to be connected to the two second connection lines. For a portion of the connection pattern located between the first connection line and a second connection line, a length of a contour from the first connection line to the second connection line is greater than a distance between the first connection line and the second connection line.

20 Claims, 23 Drawing Sheets

(56) References Cited

U.S. PATENT DOCUMENTS

2019/0369787 A1\* 12/2019 Park ...................... G06F 1/1684
2020/0064968 A1\* 2/2020 Kim ...................... H10K 59/131
2020/0142525 A1\* 5/2020 Han ...................... G06F 3/0445

\* cited by examiner

TOUCH STRUCTURE, DISPLAY PANEL AND DISPLAY APPARATUS

CROSS-REFERENCE TO RELATED APPLICATION

This application is a national phase entry under 35 USC 371 of International Patent Application No. PCT/CN2022/102903, filed on Jun. 30, 2022, which is incorporated herein by reference in its entirety.

TECHNICAL FIELD

The present disclosure relates to the field of display technologies, and in particular, to a touch structure, a display panel and a display apparatus.

BACKGROUND

With the continuous development of electronic products, touch display apparatuses having a touch function and a display function can realize simple and flexible human-computer interaction, and thus have been widely used. A touch panel in the touch display apparatus includes, for example, a one glass solution (OGS) touch panel, an on-cell touch panel and an in-cell touch panel.

An on-cell technology refers to a touch structure being provided on a display side of a display panel. For example, the touch structure may be formed directly on a thin film encapsulation (TFE) layer of the display panel.

SUMMARY

In an aspect, a touch structure is provided. The touch structure includes: a first conductive layer, an insulating layer and a second conductive layer that are stacked in sequence. The second conductive layer is located above the first conductive layer, and the second conductive layer includes a plurality of touch electrodes and a plurality of touch lines.

The touch structure includes at least one jumper structure, and a jumper structure in the at least one jumper structure includes: a first connection line, two second connection lines and at least one connection pattern; the first connection line and the two second connection lines are located in the second conductive layer, and the at least one connection pattern is located in the first conductive layer; the first connection line and the two second connection lines are arranged in parallel and at intervals, and the two second connection lines are arranged at two sides of the first connection line, respectively; a connection pattern in the at least one connection pattern crosses the first connection line, and two ends of the connection pattern pass through the insulating layer to be connected to the two second connection lines, respectively.

A distance between the first connection line and a second connection line in the two second connection lines is a first dimension; for a portion of the connection pattern located between the first connection line and the second connection line, a length of a contour from the first connection line to the second connection line is a second dimension; and the second dimension is greater than the first dimension.

In some embodiments, the connection pattern includes a first connection portion and two first conductive portions disposed at two ends of the first connection portion; in a first direction, dimensions of the two first conductive portions are greater than a dimension of the first connection portion; and the first direction is substantially parallel to an extending direction of the first connection line.

The first connection portion crosses the first connection line; the two first conductive portions correspond to the two second connection lines, respectively, and each first conductive portion passes through the insulating layer to be connected to a corresponding second connection line. An edge of the first conductive portion proximate to the first connection line exceeds an edge of the corresponding second connection line proximate to the first connection line.

In some embodiments, in the first direction, a dimension of a first conductive portion in at least one first conductive portion is substantially equal to a dimension of a corresponding second connection line.

In some embodiments, an edge of a first conductive portion in at least one first conductive portion proximate to the first connection line is substantially parallel to an edge of a corresponding second connection line proximate to the first connection line.

In some embodiments, an average distance between an edge of a first conductive portion in at least one first conductive portion proximate to the first connection line and an edge of a corresponding second connection line proximate to the first connection line is D; a dimensional tolerance of the first conductive portion in a second direction is $CD_1$, and the second direction is substantially perpendicular to the extending direction of the first connection line; a positional tolerance of the first conductive portion is $OL_1$; a dimensional tolerance of the corresponding second connection line in the second direction is $CD_2$; and a positional tolerance of the corresponding second connection line is $OL_2$.

$$D > \frac{CD_1}{2} + OL_1 + \frac{CD_2}{2} + OL_2, \text{ or}$$

$$D > \sqrt{\left(\frac{CD_1}{2}\right)^2 + OL_1^2 + \left(\frac{CD_2}{2}\right)^2 + OL_2^2}.$$

In some embodiments, an edge of a first conductive portion in at least one first conductive portion away from the first connection line exceeds an edge of a corresponding second connection line away from the first connection line.

In some embodiments, the connection pattern includes a second conductive portion, an orthographic projection of the first connection line on a reference plane overlaps with an orthographic projection of the second conductive portion on the reference plane, and the reference plane is a plane in which the first conductive layer is located.

Two opposite edges of the second conductive portion in a second direction are a first edge and a second edge, and two opposite edges of the first connection line in the second direction are a third edge and a fourth edge; the first edge corresponds to the third edge, and the first edge exceeds the third edge; the second edge corresponds to the fourth edge, and the second edge exceeds the fourth edge; and the second direction is substantially perpendicular to an extending direction of the first connection line.

In some embodiments, in a first direction, a dimension of the second conductive portion is substantially equal to a dimension of the first connection line, and the first direction is substantially parallel to the extending direction of the first connection line.

In some embodiments, the first edge is substantially parallel to the third edge; and/or the second edge is substantially parallel to the fourth edge.

In some embodiments, the connection pattern further includes two first conductive portions and two second connection portions, a first conductive portion in the two first conductive portions is connected to the second conductive portion through a second connection portion in the two second connection portions, and the second conductive portion is connected to another first conductive portion in the two first conductive portions through another second connection portion in the two second connection portions.

In some embodiments, the second conductive portion and the two second connection portions constitute a crossover portion, the crossover portion crosses the first connection line, and the two first conductive portions pass through the insulating layer to be connected to respective second connection lines.

In some embodiments, the touch structure further includes an installation hole penetrating the touch structure. The plurality of touch electrodes include a plurality of first touch electrodes and a plurality of second touch electrodes. The touch structure has a plurality of first touch units and a plurality of second touch units; a first touch unit in the plurality of first touch units includes first touch electrodes that are arranged along a third direction and connected, and a second touch unit in the plurality of second touch units includes second touch electrodes that are arranged along a fourth direction and connected; the third direction intersects the fourth direction.

The plurality of first touch electrodes include at least one first electrode and at least one second electrode that are located at a periphery of the installation hole, and the plurality of second touch electrodes include at least one third electrode and at least one fourth electrode that are located at the periphery of the installation hole.

The jumper structure is disposed around the installation hole; the first connection line is connected to a first electrode and a second electrode that belong to a same first touch unit; one of the two second connection lines is connected to a third electrode, and another one of the two second connection lines is connected to a fourth electrode, and the third electrode and the fourth electrode belong to a same second touch unit.

In some embodiments, the at least one jumper structure includes a plurality of jumper structures around the installation hole. The first touch unit includes the first electrode and the second electrode that are located at the periphery of the installation hole, and the first connection line is connected to the first electrode and the second electrode.

The second touch unit includes the third electrode and the fourth electrode that are located at the periphery of the installation hole, one of the two second connection lines is a first target lead, and another one of the two second connection lines is a second target lead; and the first target lead includes a first line segment and a second line segment that are arranged separately.

The third electrode is connected to the first line segment, and the fourth electrode is connected to the second line segment; the at least one connection pattern includes a plurality of connection patterns, a connection pattern in the plurality of connection patterns crosses the first connection line in the jumper structure, an end of the connection pattern is connected to the first line segment, and another end of the connection pattern is connected to the second target lead; another connection pattern in the plurality of connection patterns crosses a first connection line in another jumper structure in the plurality of jumper structures, an end of the another connection pattern is connected to the second target lead, and another end of the another connection pattern is connected to the second line segment.

In some embodiments, the first connection line and the two second connection lines are disposed along an edge of the installation hole; length extending directions of the plurality of connection patterns pass the installation hole.

A distance between the installation hole and an edge of the first electrode proximate to the installation hole is less than a distance between the installation hole and an edge of the third electrode proximate to the installation hole, and is less than a distance between the installation hole and an edge of the fourth electrode proximate to the installation hole. A distance between the installation hole and an edge of the second electrode proximate to the installation hole is less than the distance between the installation hole and the edge of the third electrode proximate to the installation hole, and is less than the distance between the installation hole and the edge of the fourth electrode proximate to the installation hole.

A distance between the installation hole and the first line segment, a distance between the installation hole and the first connection line, and a distance between the installation hole and the second target lead are sequentially decreased; and a distance between the installation hole and the second line segment, a distance between the installation hole and the first connection line in the another jumper structure, and a distance between the installation hole and the second target lead are sequentially decreased.

In some embodiments, the plurality of first touch electrodes further include at least one fifth electrode located at the periphery of the installation hole, a fifth electrode in the at least one fifth electrode is located between the first electrode and the second electrode in the third direction, and the fifth electrode is connected to the first connection line.

The plurality of second touch electrodes further include at least one sixth electrode located at the periphery of the installation hole, a sixth electrode in the at least one sixth electrode is located between the third electrode and the fourth electrode in the fourth direction, and the sixth electrode is connected to the second target lead.

In some embodiments, areas of the first electrode, the second electrode, the third electrode and the fourth electrode are all less than an area of a touch electrode that is not penetrated by the installation hole.

The plurality of first touch electrodes further include at least one fifth electrode located at the periphery of the installation hole; an area of a fifth electrode in the at least one fifth electrode is less than an area of the first electrode, and is less than an area of the second electrode. The plurality of second touch electrodes further include at least one sixth electrode located at the periphery of the installation hole; an area of a sixth electrode in the at least one sixth electrode is less than an area of the third electrode, and is less than an area of the fourth electrode.

In some embodiments, the touch structure includes: a touch region, a first wiring region and a second wiring region that are located on two opposite sides of the touch region in a first direction, and a third wiring region and a fourth wiring region that are located on two opposite sides of the touch region in the second direction.

The plurality of touch electrodes include a plurality of first touch electrodes and a plurality of second touch electrodes. The touch structure has a plurality of first touch units and a plurality of second touch units; a first touch unit in the plurality of first touch units includes first touch electrodes that are arranged along a third direction and connected, and a second touch unit in the plurality of second touch units includes second touch electrodes that are arranged along a fourth direction and connected; the third direction intersects the fourth direction.

The plurality of touch lines include a plurality of first touch lines and a plurality of second touch lines; each first touch unit is electrically connected to at least one first touch line, and a first touch line in the at least one first touch line is led out from the first wiring region and extends to the second wiring region through the fourth wiring region. Each second touch unit is electrically connected to at least one second touch line, and a second touch line in the at least one second touch line is led out from the third wiring region and extends to the second wiring region.

The touch region includes a corner region adjacent to the first wiring region and the third wiring region; a first touch unit in the plurality of first touch units closest to the third wiring region includes a first corner touch electrode located in the corner region, and a second touch unit in the plurality of second touch units closest to the first wiring region includes a second corner touch electrode located in the corner region.

The first connection line is connected to the first corner touch electrode and the first touch line; one of the two second connection lines is connected to the second corner touch electrode, and another one of the two second connection lines is connected to the second touch line. Or the plurality of touch lines further include a third touch line and a fourth touch line, the third touch line is connected to the first corner touch electrode, and the fourth touch line is connected to the second corner touch electrode; the first connection line is connected to the first touch line and the third touch line; one of the two second connection lines is connected to the second touch line, and another one of the two second connection lines is connected to the fourth touch line.

In some embodiments, the first connection line and the second connection lines are disposed along an outer edge of the corner region; a length extending direction of the connection pattern passes the corner region.

The first corner touch electrode includes a fifth edge proximate to the outer edge of the corner region, and the second corner touch electrode includes a sixth edge proximate to the outer edge of the corner region; a distance between the fifth edge and the outer edge of the corner region is less than a distance between the sixth edge and the outer edge of the corner region. A distance between the outer edge of the corner region and the second connection line connected to the second corner touch electrode, a distance between the outer edge of the corner region and the first connection line, and a distance between the outer edge of the corner region and the second connection line connected to the second touch line are sequentially decreased.

In some embodiments, the first connection line, the second connection line and the connection pattern each include a metal mesh structure.

In another aspect, a display panel is provided. The display panel includes a display substrate and the touch structure as described in any one of the embodiments above. The touch structure is disposed on a light exit side of the display substrate.

In yet another aspect, a display apparatus is provided. The display apparatus includes the display panel as described in the embodiments above.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Figure 1:
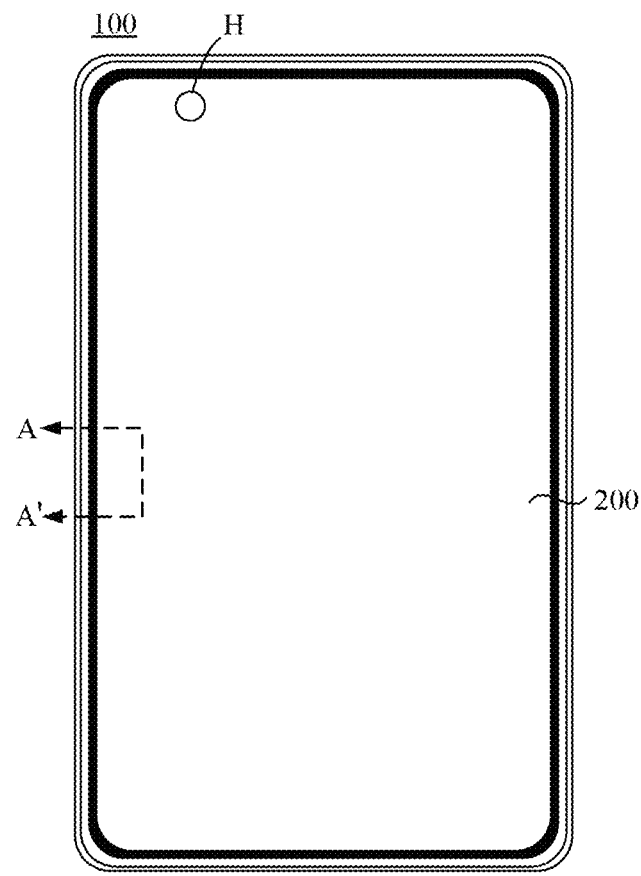
FIG. 1 is a top view of a display apparatus, in accordance with some embodiments.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

In the description of some embodiments, the terms "connected" and derivatives thereof may be used. For example, the term "connected" may be used in the description of some embodiments to indicate that two or more components are in direct physical or electrical contact with each other. The embodiments disclosed herein are not necessarily limited to the context herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

In addition, the phrase "based on" used is meant to be open and inclusive, since a process, step, calculation or other action that is "based on" one or more of the stated conditions or values may, in practice, be based on additional conditions or values exceeding those stated.

As used herein, the term such as "about", "substantially" or "approximately" includes a stated value and an average value within an acceptable range of deviation of a particular value. The acceptable range of deviation is determined by a person of ordinary skill in the art in view of measurement in question and errors associated with measurement of a particular quantity (i.e., the limitation of the measurement system).

As used herein, the term such as "parallel", "perpendicular" or "equal" includes a stated condition and a condition similar to the stated condition. A range of the similar condition is within an acceptable range of deviation, and the acceptable range of deviation is determined by a person of ordinary skill in the art in view of measurement in question and errors associated with measurement of a particular quantity (i.e., the limitation of the measurement system). For example, the term "parallel" includes absolute parallelism and approximate parallelism, and an acceptable range of deviation of the approximate parallelism may be, for example, a deviation within 5°. The term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of approximate equality may be, for example, that a difference between two equals is less than or equal to 5% of any one of the two equals.

It will be understood that, in a case where a layer or component is referred to as being on another layer or a substrate, it may be that the layer or component is directly on the another layer or substrate; or it may be that intermediate layer(s) exist between the layer or component and the another layer or substrate.

Exemplary embodiments are described herein with reference to sectional views and/or plan views as idealized exemplary drawings. In the drawings, thicknesses of layers and sizes of regions are enlarged for clarity. Variations in shape relative to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown to have a rectangular shape generally has a feature of being curved. Therefore, the regions shown in the accompanying drawings are schematic in nature, and their shapes are not intended to show actual shapes of regions in an apparatus, and are not intended to limit the scope of the exemplary embodiments.

FIG. 1 is a top view of a display apparatus, in accordance with some embodiments.

Referring to FIG. 1, the display apparatus 100 provided in some embodiments of the present disclosure includes a display panel 200.

The display apparatus 100 may be a liquid crystal display (LCD) apparatus; the display apparatus 100 may also be an electroluminescent display apparatus or a photoluminescence display apparatus. In the case where the display apparatus 100 is the electroluminescent display apparatus, the electroluminescent display apparatus may be an organic light-emitting diode (OLED) display apparatus or a quantum dot light-emitting diode (QLED) display apparatus. In the case where the display apparatus 100 is the photoluminescent display apparatus, the photoluminescent display apparatus may be a quantum dot photoluminescent display apparatus.

The display apparatus 100 may be any apparatus that displays an image whether in motion (e.g., a video) or stationary (e.g., a still image), and whether literal or graphical. More specifically, it is anticipated that the embodiments may be implemented in or associated with a variety of electronic devices. The variety of electronic devices include (but not limit to), for example, mobile telephones, wireless devices, personal data assistants (PDAs), hand-held or portable computers, global positioning system (GPS) receivers/navigators, cameras, MPEG-4 Part 14 (MP4) video players, video cameras, game consoles, watches, clocks, calculators, television monitors, flat panel displays, computer monitors, automobile displays (e.g., odometer displays), navigators, cockpit controllers and/or displays, camera view displays (e.g., rear view camera displays in a vehicle), electronic photos, electronic billboards or signages, projectors, architectural structures, packaging and aesthetic structures (e.g., displays for displaying an image of a piece of jewelry).

Embodiments of the present disclosure are described below by taking an example in which the display apparatus 100 is the OLED display apparatus. In this case, the display panel 200 is an OLED display panel.

At current, active area (AA) hole technologies and full display with camera (FDC) technologies are generally used for an OLED display panel. The AA Hole technology means that a hole (an installation hole H in the display panel 200 in FIG. 1) is provided in the OLED display panel, and the hole is used for providing camera(s) and other functional device(s) therein. As a result, a space of a screen may be effectively utilized, and thus a screen-to-body ratio (i.e., a ratio of an area of the active area actually used for displaying an image to an area of an entire front surface of the display panel) is improved.

Figure 2:
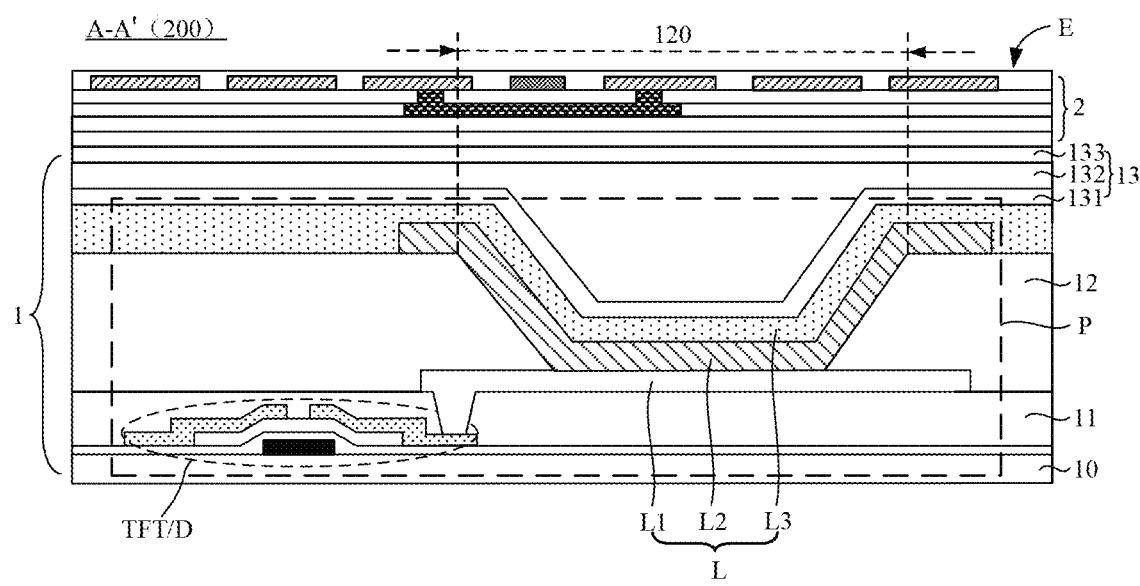
FIG. 2 is a sectional view of a display panel in FIG. 1 taken along the section line A-A'.

FIG. 2 is a sectional view of the display panel in FIG. 1 taken along the section line A-A'.

In some embodiments, as shown in FIG. 2, the display panel 200 includes a display substrate 1 and a touch structure 2, and the touch structure 2 is disposed on a light exit side E of the display substrate 1.

As shown in FIG. 2, the display substrate 1 includes a base substrate 10 and a plurality of sub-pixels P disposed on the base substrate 10. Each sub-pixel P includes a pixel driving circuit D and light-emitting device(s) L that are disposed on the base substrate 10. The pixel driving circuit D includes a plurality of thin film transistors (TFTs). The light-emitting device L includes an anode L1, a light-emitting functional layer L2 and a cathode L3. The anode L1 is electrically connected to a drain (or a source) of a thin film transistor (TFT) that is served as a driving transistor in the plurality of thin film transistors.

As shown in FIG. 2, the display substrate 1 further includes a planarization layer 11 disposed between thin film transistors TFT and anodes L1.

As shown in FIG. 2, the display substrate 1 further includes a pixel define layer 12 including a plurality of opening regions 120. A light-emitting device L is disposed in an opening region 120. In some embodiments, the light-emitting functional layer L2 includes a light-emitting layer. In some other embodiments, in addition to the light-emitting layer, the light-emitting functional layer 362 further includes one or more of an electron transport layer (ETL), an electron injection layer (EIL), a hole transport layer (HTL) and a hole injection layer (HIL).

The display panel 200 may be a top-emission display panel. In this case, the anode L1 closer to the base substrate 10 is opaque, and the cathode L3 farther away from the base substrate 10 is transparent or semi-transparent. The display panel 200 may also be a bottom-emission display panel. In this case, the anode L1 closer to the base substrate 10 is transparent or semi-transparent, and the cathode L3 farther away from the base substrate 10 is opaque. The display panel 200 may also be a double-sided emission display panel. In this case, both the anode L1 closer to the base substrate 10 and the cathode L3 farther away from the base substrate 10 are transparent or semi-transparent.

In some embodiments, as shown in FIG. 2, the display substrate 1 further includes a thin film encapsulation layer 13 disposed on a side of light-emitting devices L away from the base substrate 10.

For example, the thin film encapsulation layer 13 includes: a first inorganic barrier layer 131, an organic barrier layer 132 and a second inorganic barrier layer 133 that are sequentially stacked on the side of the light-emitting devices L away from the base substrate 10. The first inorganic barrier layer 131 and the second inorganic barrier layer 133 each have a function of blocking water vapor and oxygen, and the organic barrier layer 132 has certain flexibility and a function of absorbing water vapor. Thus, the formed thin film encapsulation layer 13 has a good encapsulating performance.

In some embodiments, as shown in FIG. 2, for the on-cell technology, the touch structure 2 is directly arranged on the thin film encapsulation layer 13. That is, no other film layer is provided between the touch structure 2 and the thin film encapsulation layer 13, which helps reduce a thickness of the display panel 200, thereby achieving the lightness and thinness of the display panel 200.

Figure 3:
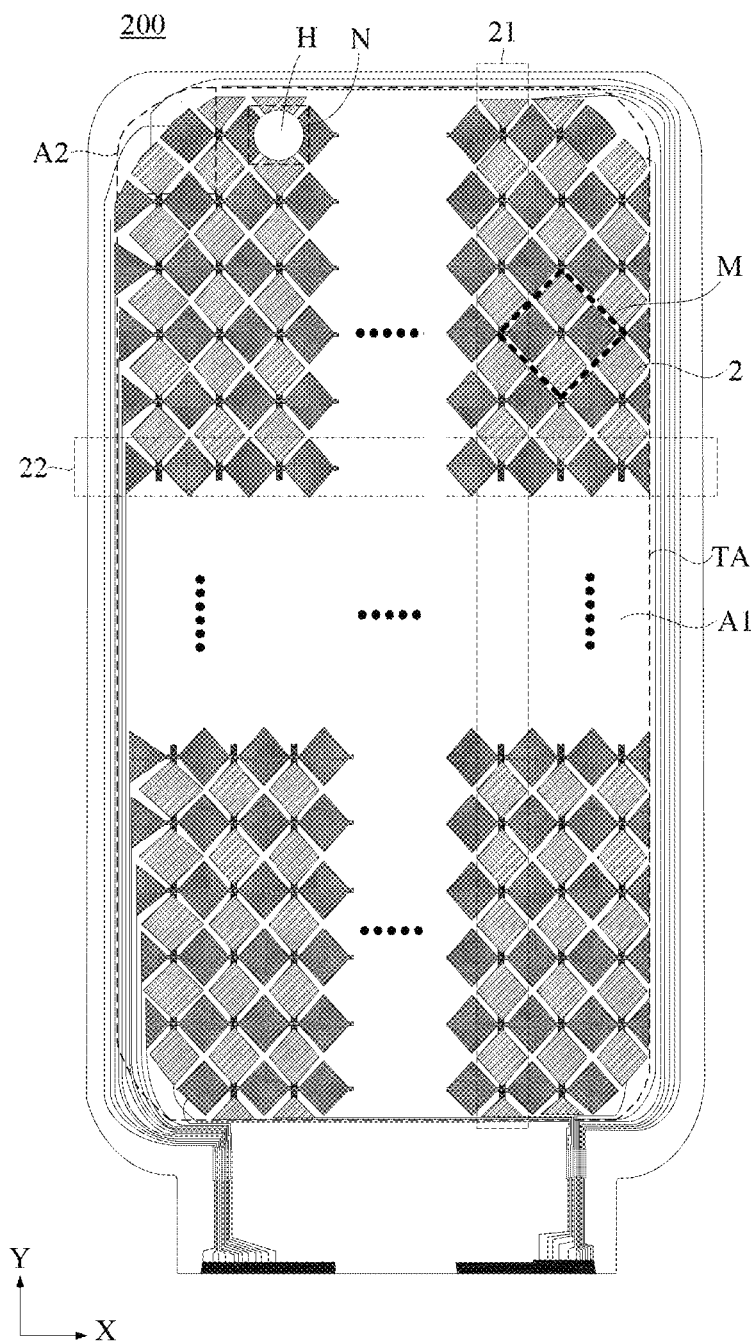
FIG. 3 is a top view of a display panel, in accordance with some embodiments.
Figure 4A:
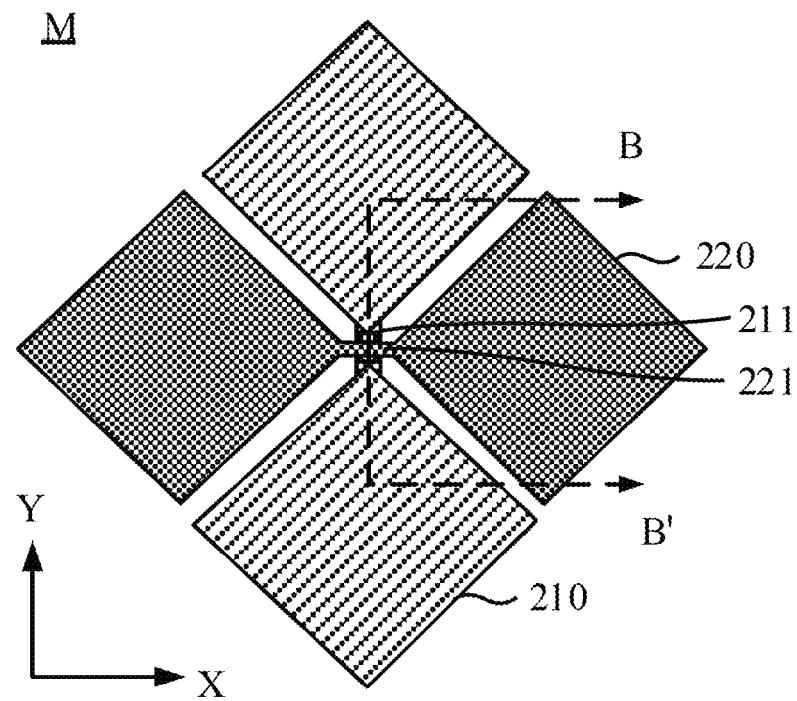
FIG. 4A is a partial enlarged view of the region M of the display panel in FIG. 3.
Figure 4B:
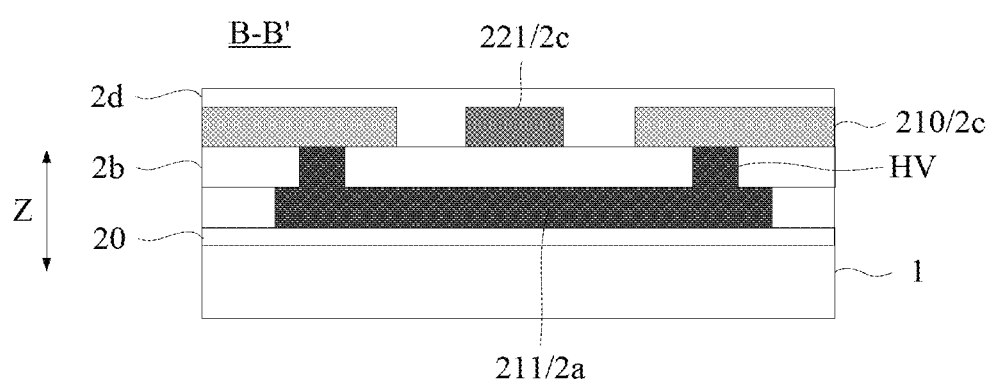
FIG. 4B is a sectional view of the display panel in FIG. 4A taken along the section line B-B'.
Figure 4C:
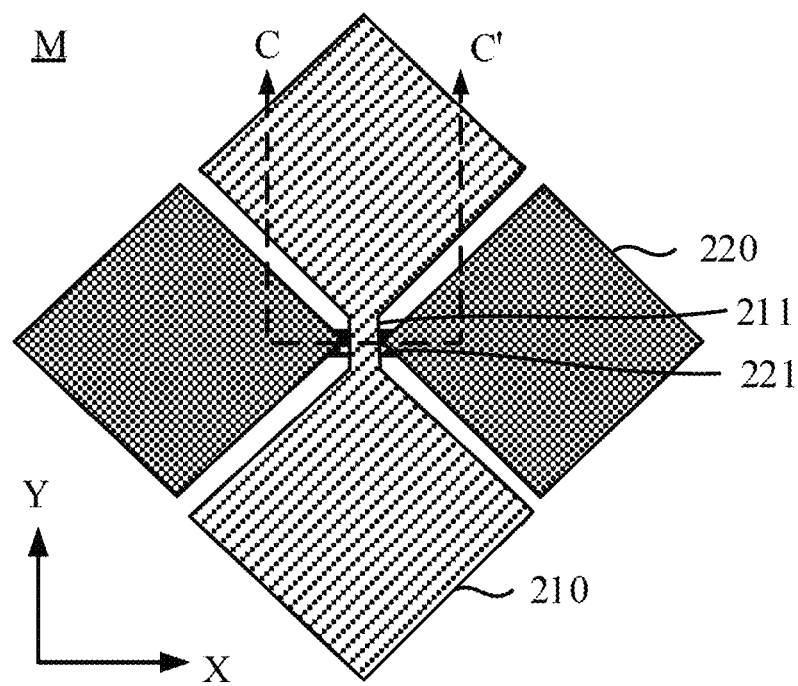
FIG. 4C is another partial enlarged view of the region M of the display panel in FIG. 3.
Figure 4D:
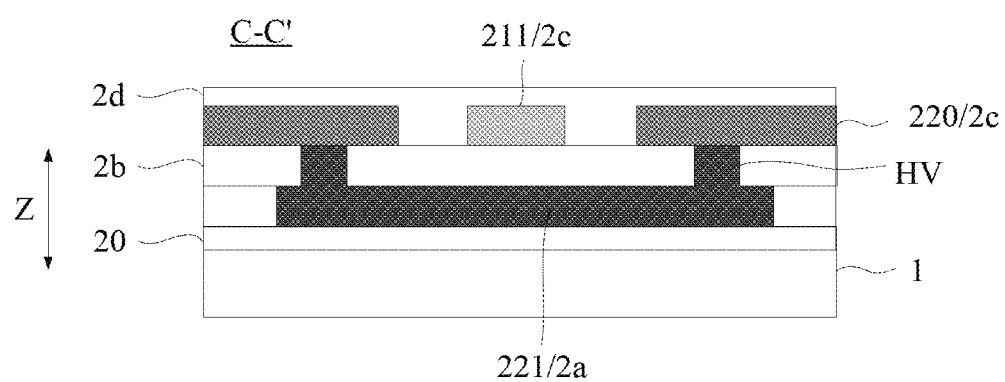
FIG. 4D is a sectional view of the display panel in FIG. 4C taken along the section line C-C'.
Figure 5:
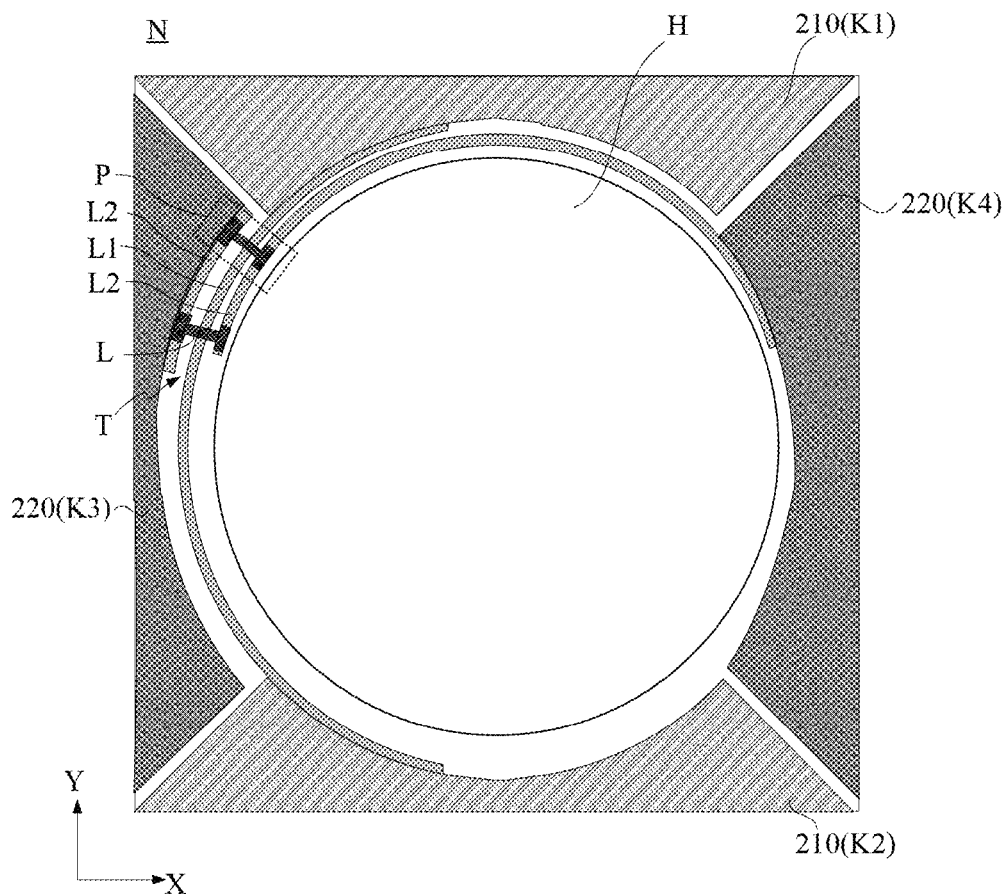
FIG. 5 is a partial enlarged view of the region N of the display panel in FIG. 3.
Figure 6:
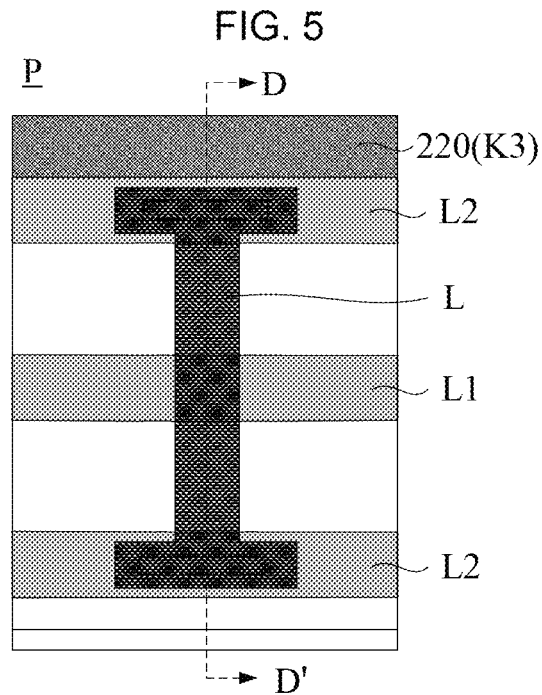
FIG. 6 is a partial enlarged view of the region P of the display panel in FIG. 5.
Figure 7:
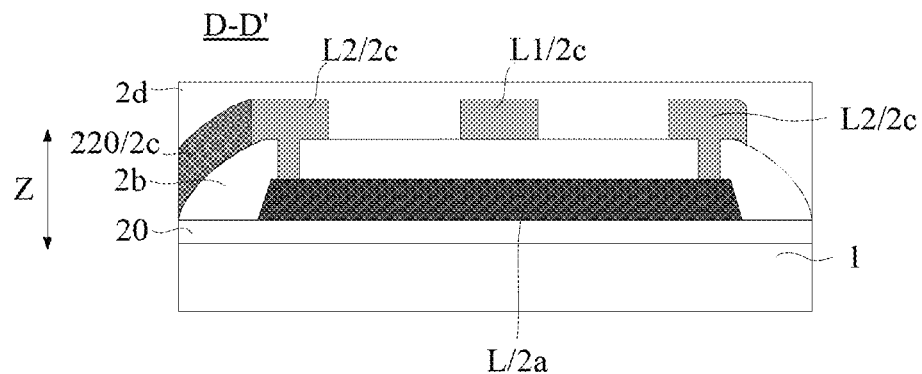
FIG. 7 is a sectional view of the display panel in FIG. 6 taken along the section line D-D'.

FIG. 3 is a top view of the display panel, in accordance with some embodiments; FIG. 4A is a partial enlarged view of the region M of the display panel in FIG. 3; FIG. 4B is a sectional view of the display panel in FIG. 4A taken along the section line B-B'; FIG. 4C is another enlarged partial view of the display panel in FIG. 3 at the region M; FIG. 4D is a sectional view of the display panel in FIG. 4C taken along the section line C-C'; FIG. 5 is a partial enlarged view of the region N of the display panel in FIG. 3; FIG. 6 is a partial enlarged view of the region P of the display panel in FIG. 5; and FIG. 7 is a sectional view of the display panel in FIG. 6 taken along the section line D-D'.

Referring to FIG. 3, the display panel 200 includes the touch structure 2, and the touch structure 2 has a touch region TA. The touch region TA includes a main touch region A1 and corner regions A2, and the corner regions A2 are located around the main touch region A1.

Referring to FIGS. 3 and 4A, the touch structure 2 includes a plurality of first touch units 21 and a plurality of second touch units 22. The plurality of first touch units 21 each extend along a direction Y, and a first touch unit 21 includes a plurality of first touch electrodes 210 and a plurality of first connection bridges 211. The first touch electrodes 210 and the first connection bridges 211 are alternately arranged along the direction Y. That is, a first connection bridge 211 is electrically connected to two first touch electrodes 210 adjacent thereto.

With continued reference to FIGS. 3 and 4A, the plurality of second touch units 22 each extend along a direction X, and a second touch unit 22 includes a plurality of second touch electrodes 220 and a plurality of second connection bridges 221. The second touch electrodes 220 and the second connection bridges 221 are alternately arranged along the direction X. That is, a second connection bridge 221 is electrically connected to two second touch electrodes 220 adjacent thereto.

It will be noted that, one of the first touch electrode 210 and the second touch electrode 220 is a touch driving electrode (TX), and the other one thereof is a touch sense electrode (RX). Side surfaces of a first touch electrode 210 and a second touch electrode 220 that are adjacent are opposite. In a case where electrical signals are transmitted on first touch electrodes 210 and second touch electrodes 220, respectively, mutual capacitance is generated between the first touch electrode 210 and the second touch electrode 220 that are adjacent. When a finger touches the display panel 200, the finger takes away electric charges on the touch electrodes, so that mutual capacitance between touch electrodes at the touch position changes. A touch integrated circuit (IC) in the display panel 200 can detect the change of the mutual capacitance between the touch electrodes to identify the touch position of the finger, thereby achieving the touch function of the display panel 200.

The direction X intersects the direction Y. For example, the direction X is perpendicular to the direction Y. In FIG. 3, the direction X is a horizontal direction, and a direction Y is a vertical direction, which is not limited in the embodiments of the present disclosure. In some other embodiments, the direction X may also be the vertical direction, and the direction Y may also be the horizontal direction.

A connection manner between a connection bridge and two touch electrodes adjacent thereto is described below from the perspective of a film structure.

Referring to FIG. 4B, the touch structure 2 includes: a first conductive layer 2a, an insulating layer 2b and a second conductive layer 2c that are stacked in sequence. The second conductive layer 2c is located above the first conductive layer 2a, and the insulating layer 2b is provided with a plurality of via holes HV therein.

It will be noted that the touch structure 2 further includes a buffer layer 20. The buffer layer 20 is located between the display substrate 1 and the first conductive layer 2a, and the buffer layer 20 plays a role of insulation.

With continued reference to FIGS. 4A and 4B, first touch electrodes 210, second touch electrodes 220 and second connection bridges 221 are located in the second conductive layer 2c, and first connection bridges 211 are located in the first conductive layer 2a. In the direction X, two adjacent second touch electrodes 220 are electrically connected through a second connection bridge 221. In the direction Y, a first connection bridge 211 passes through different via holes HV in the insulating layer 2b to be electrically connected to two first touch electrodes 210 adjacent thereto.

Alternatively, referring to FIGS. 4C and 4D, the first touch electrodes 210, the second touch electrodes 220 and the first connection bridges 211 are located in the second conductive layer 2c, and the second connection bridges 221 are located in the first conductive layer 2a. In the direction X, two adjacent first touch electrodes 210 are electrically connected through a first connection bridge 211. In the direction Y, a second connection bridge 221 passes through different via holes HV in the insulating layer 2b to be electrically connected to two second touch electrodes 220 adjacent thereto.

In addition, referring to FIGS. 4B and 4D, the touch structure 2 further includes a protective layer 2d disposed on a side of the second conductive layer 2c away from the display substrate 1, and the protective layer plays a role of protecting the touch structure 2 and insulation.

A technology adopted by the structural design of the touch structure 2 is a flexible multi-layer on cell (FMLOC) technology. That is, two conductive layers are adopted to form the first touch electrodes 210, the second touch electrodes 220, the first connection bridges 211 and the second connection bridges 221.

Referring to FIGS. 3 and 5, an arrangement of the installation hole H will destroy an completeness of the touch electrode in the touch structure 2 and affect the arrangement of the first connection bridge 211 and the second connection bridge 221, which causes that first touch electrodes 210 located at an edge of the installation hole H cannot be connected to each other, and second touch electrodes 220 located at the edge of the installation hole H cannot be connected to each other.

In order to achieve a normal connection between the touch electrodes around the installation hole H, a jumper structure T may be adopted for connection, and a design of a corresponding jumper structure T is described below based on the number of first touch units 21 passing the installation holes H and the number of second touch units 22 passing the installation holes H.

Referring to FIGS. 3 and 5, one first touch unit 21 and one second touch unit 22 both pass the installation hole H, the plurality of first touch electrodes 210 in the first touch unit 21 include at least one first electrode K1 and at least one second electrode K2 that are located at a periphery of the installation hole H. For example, the plurality of first touch electrodes 210 include one first electrode K1 and one second electrode K2 that are located at the periphery of the installation hole H, and the installation hole H destroys the completeness of the two first touch electrodes 210 (the first electrode K1 and the second electrode K2).

The plurality of second touch electrodes 220 in the second touch unit 22 include at least one third electrode K3 and at least one fourth electrode K4 that are located at the periphery of the installation hole H. For example, the plurality of second touch electrodes 220 include one third electrode K3 and one fourth electrode K4 that are located at the periphery of the installation hole H, and the installation hole H destroys the completeness of the two second touch electrodes 220 (the third electrode K3 and the fourth electrode K4).

Based on this, referring to FIG. 5, the jumper structure T is disposed around the installation hole H, and the jumper structure T includes: one first connection line L1, two second connection lines L2 and at least one connection pattern L. The first connection line L1 is directly connected to the first electrode K1 and the second electrode K2, thereby achieving the normal connection between the first electrode K1 and the second electrode K2.

Referring to FIGS. 5, 6 and 7, one of the two second connection lines L2 is directly connected to the third electrode K3, and the other one of the two second connection lines L2 is directly connected to the fourth electrode K4. The first connection line L1 and the two second connection lines L2 are located in the second conductive layer 2c, and the connection pattern(s) L are located in the first conductive layer 2a. The first connection line L1 and the two second connection lines L2 are arranged in parallel and at intervals, and the two second connection lines L2 are arranged at two sides of the first connection line L1, respectively. The connection pattern L crosses the first connection line L1, and two ends of the connection pattern L pass through the insulating layer 2b to be connected to the two second connection lines L2, respectively. As a result, a normal connection between the third electrode K3 and the fourth electrode K4 is achieved.

Figure 8:
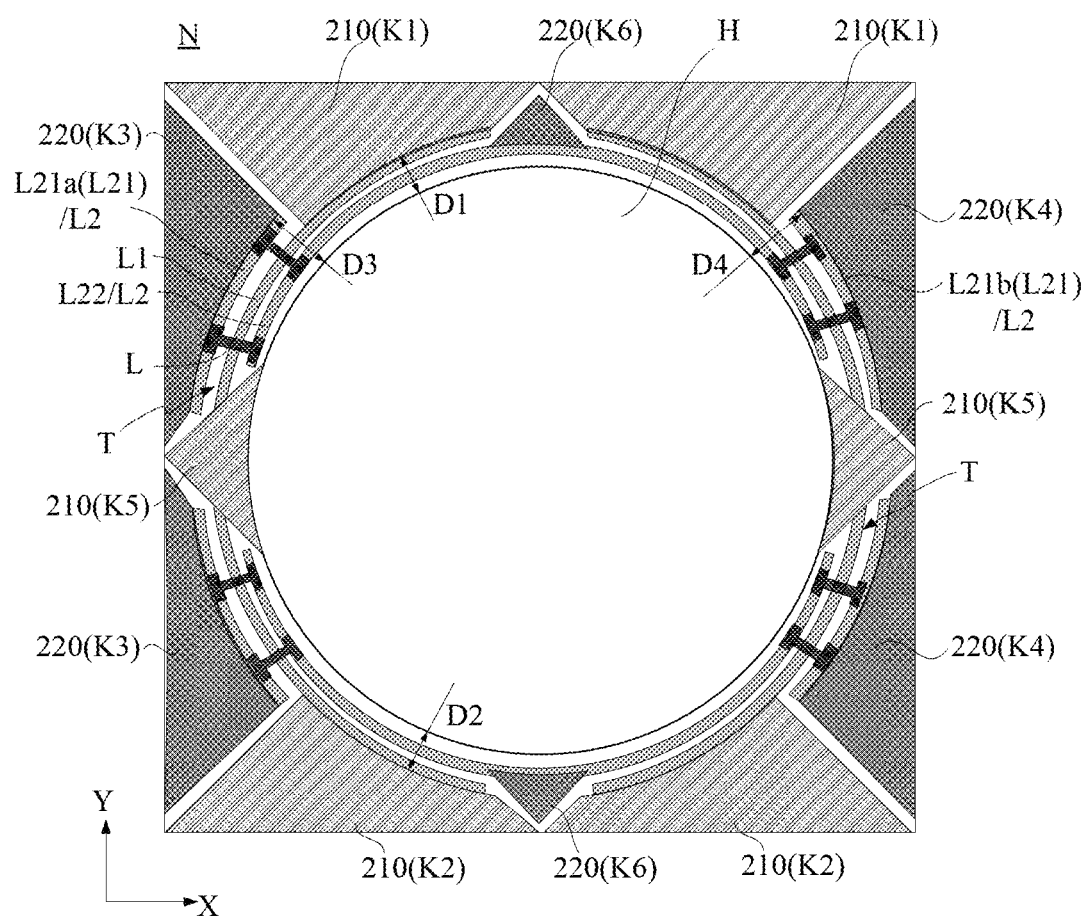
FIG. 8 is another partial enlarged view of the region N of the display panel in FIG. 3.

FIG. 8 is another partial enlarged view of the region N of the display panel in FIG. 3.

In some other embodiments, referring to FIG. 8, two first touch units 21 and two second touch units 22 all pass the installation hole H. It will be understood that, a diameter of the installation hole H shown in FIG. 8 is greater than a diameter of the installation hole H shown in FIG. 5, and the number of touch electrodes damaged by the installation hole H shown in FIG. 8 is more than the number of touch electrodes damaged by the installation hole H shown in FIG. 5.

Each first touch unit 21 in the two first touch units 21 includes one first electrode K1 and one second electrode K2 that are located at the periphery of the installation hole H, and the installation hole H destroys the completeness of the first electrode K1 and the second electrode K2 in each first touch unit 21.

Each second touch unit 22 in the two second touch units 22 includes one third electrode K3 and one fourth electrode K4 that are located at the periphery of the installation hole H, and the installation hole H destroys the completeness of the third electrode K3 and the fourth electrode K4 in each second touch unit 22.

Based on this, a plurality of jumper structures T are provided around the installation hole H. A first connection line L1 in a jumper structure T is directly connected to a first electrode K1 and a second electrode K2 in a same first touch unit 21, thereby achieving the normal connection between the first electrode K1 and the second electrode K2.

With continued reference to FIG. 8, for the same jumper structure T, one of the two second connection lines L2 is referred to as a first target lead L21, and the other one of the two second connection lines L2 is referred to as a second target lead L22. The first target lead L21 includes a first line segment L21a and a second line segment L21b that are arranged separately. A third electrode K3 in a second touch unit 22 is directly connected to the first line segment L21a, and a fourth electrode K4 in the same second touch unit 22 is directly connected to the second line segment L21b. At least one connection pattern L crosses a first connection line L1 in a jumper structure T; an end of the connection pattern L is connected to the first line segment L21a, and the other end of the connection pattern L is connected to the second target lead L22. At least one connection pattern L crosses a first connection line L1 in another jumper structure T; an end of the connection pattern L is connected to the second target lead L22, and the other end of the connection pattern L is connected to the second line segment L21b. As a result, the normal connection between the third electrode K3 and the fourth electrode K4 is achieved.

In some embodiments, as shown in FIG. 8, the first connection line L1 and the second connection lines L2 in the jumper structure T are disposed along the edge of the installation hole H, and length extending directions of the connection patterns L pass the installation hole H.

With such an arrangement, it may be possible to enable the arrangement of the jumper structure T to be compact, and reduce an area occupied by the jumper structure T at the periphery of the installation hole H. As a result, an area of the periphery of the installation hole H for arranging the touch electrodes is increased, and a facing area of side surfaces of the touch electrodes is increased, thereby helping improve the touch performance of the periphery of the installation hole H.

As shown in FIG. 8, a distance D1 between the installation hole H and an edge of the first electrode K1 proximate to the installation hole H is less than a distance D3 between the installation hole H and an edge of the third electrode K3 proximate to the installation hole H, and is less than a distance D4 between the installation hole H and an edge of the fourth electrode K4 proximate to the installation hole H. A distance D2 between the installation hole H and an edge of the second electrode K2 proximate to the installation hole H is less than the distance D3 between the installation hole H and the edge of the third electrode K3 proximate to the installation hole H, and is less than the distance D4 between the installation hole H and the edge of the fourth electrode K4 proximate to the installation hole H.

In addition, a distance between the installation hole H and the first line segment L21a of the first target lead L21, a distance between the installation hole H and the first connection line L1, and a distance between the installation hole H and the second target lead L22 are sequentially decreased; and a distance between the installation hole H and the second line segment L21b of the first target lead L21, a distance between the installation hole H and another first connection line L1, and a distance between the installation hole H and the second target lead L22 are sequentially decreased.

It will be understood that, in combination with FIG. 8, the distance between the installation hole H and the edge of the third electrode K3 proximate to the installation hole H, and the distance between the installation hole H and the edge of the fourth electrode K4 proximate to the installation hole H are larger; and the distance between the installation hole H and the edge of the first electrode K1 proximate to the installation hole H, and the distance between the installation hole H and the edge of the second electrode K2 proximate to the installation hole H are smaller. In addition, the distance between the installation hole H and the first target lead L21, the distance between the installation hole H and the first connection line L1, and the distance between the installation hole H and the second target lead L22 are sequentially decreased.

With such an arrangement, edges, proximate to the installation hole H. of the first electrode K1 to the fourth electrode K4 are matched with a wiring arrangement of the first target lead L21, the first connection line L1 and the second target lead L22, thereby achieving a connection between the first target lead L21 and the third electrode K3, a connection between the first target lead L21 and the fourth electrode K4, a connection between the first connection line L1 and the first electrode K1 and a connection between the first connection line L1 and the second electrode K2, and avoiding the problem of short circuit due to crossing between the connection lines in the second conductive layer 2c.

In some embodiments, as shown in FIG. 8, each first touch unit 21 further includes at least one fifth electrode K5 located at the periphery of the installation hole H. For example, each first touch unit 21 further includes one fifth electrode K5 located at the periphery of the installation hole H. That is, the installation hole H destroys the completeness of three first touch electrodes 210 (the first electrode K1, the second electrode K2 and the fifth electrode K5) in each first touch unit 21.

The fifth electrode K5 is located between the first electrode K1 and the second electrode K2 in the direction Y, and the fifth electrode K5 is connected to the first connection line L1. It is equivalent to the first electrode K1 being connected to the fifth electrode K5 through the first connection line L1, and the fifth electrode K5 being connected to the second electrode K2 through the first connection line L1.

The fifth electrode K5 is additionally arranged at the periphery of the installation hole H, and thus mutual capacitance is generated between the fifth electrode K5 and an adjacent third electrode K3, and mutual capacitance is generated between the fifth electrode K5 and an adjacent fourth electrode K4. As a result, it helps improve the touch performance of the periphery of the installation hole H.

As shown in FIG. 8, each second touch unit 22 further includes at least one sixth electrode K6 located at the periphery of the installation hole H. For example, each second touch unit 22 further includes one sixth electrode K6 located at the periphery of the installation hole H. That is, the installation hole H destroys the completeness of three second touch electrodes 220 (the third electrode K3, the fourth electrode K4 and the sixth electrode K6) in each second touch unit 22.

The sixth electrode K6 is located between the third electrode K3 and the fourth electrode K4 in the direction X, and the sixth electrode K6 is connected to the second target lead L22. It is equivalent to the third electrode K3 being connected to the sixth electrode K6 through the first line segment L21a, at least one connection pattern L and the second target lead L22, and the sixth electrode K6 being connected to the fourth electrode K4 through the second target lead L22, at least one connection pattern L and the second line segment L21b.

The sixth electrode K6 is additionally arranged at the periphery of installation hole H, and thus mutual capacitance is generated between the sixth electrode K6 and an adjacent first electrode K1, and mutual capacitance is generated between the sixth electrode K6 and an adjacent second electrode K2. As a result, it helps improve the touch performance of the periphery of the installation hole H.

Figure 9A:
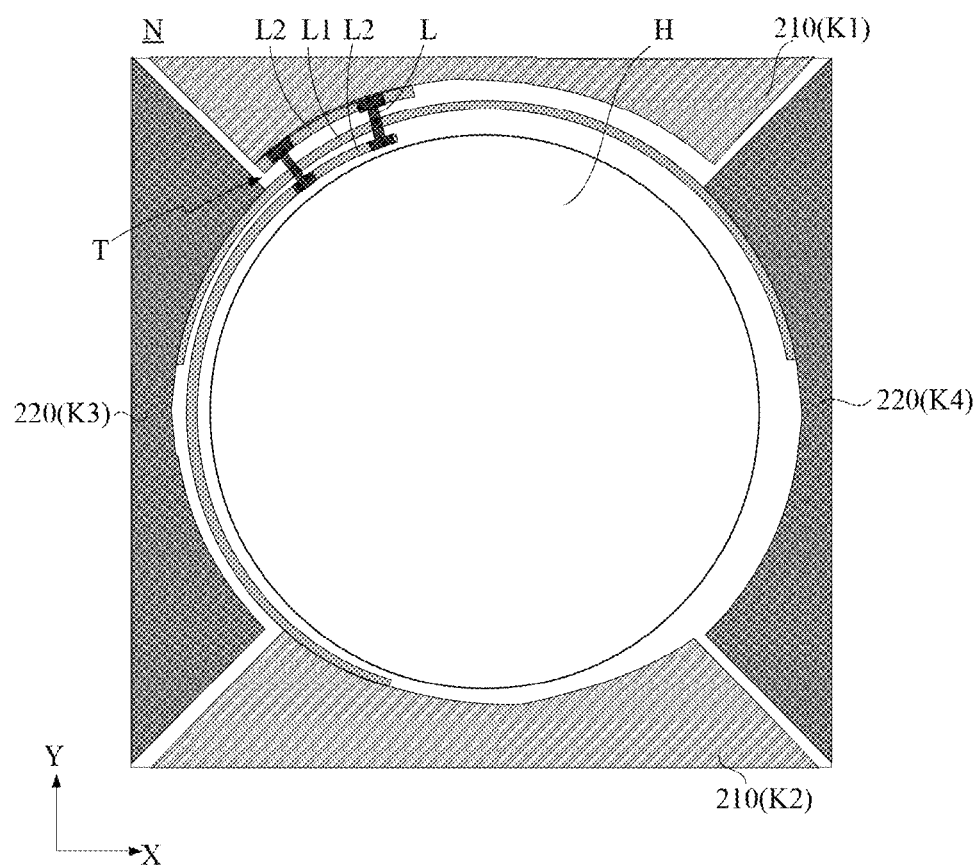
FIG. 9A is yet another partial enlarged view of the region N of the display panel in FIG. 3.

FIG. 9A is yet another partial enlarged view of the region N of the display panel in FIG. 3.

In some other embodiments, referring to FIG. 9A, one first touch unit 21 and one second touch unit 22 both pass the installation hole H. The first connection line L1 is directly connected to the third electrode K3 and the fourth electrode K4, thereby achieving the normal connection between the third electrode K3 and the fourth electrode K4.

One of the two second connection lines L2 is directly connected to the first electrode K1, and the other of the two second connection lines L2 is directly connected to the second electrode K2. The connection pattern L crosses the first connection line L1, and two ends of the connection pattern L pass through the insulating layer 2b to be connected to the two second connection lines L2, respectively. As a result, the normal connection between the first electrode K1 and the second electrode K2 is achieved.

Figure 9B:
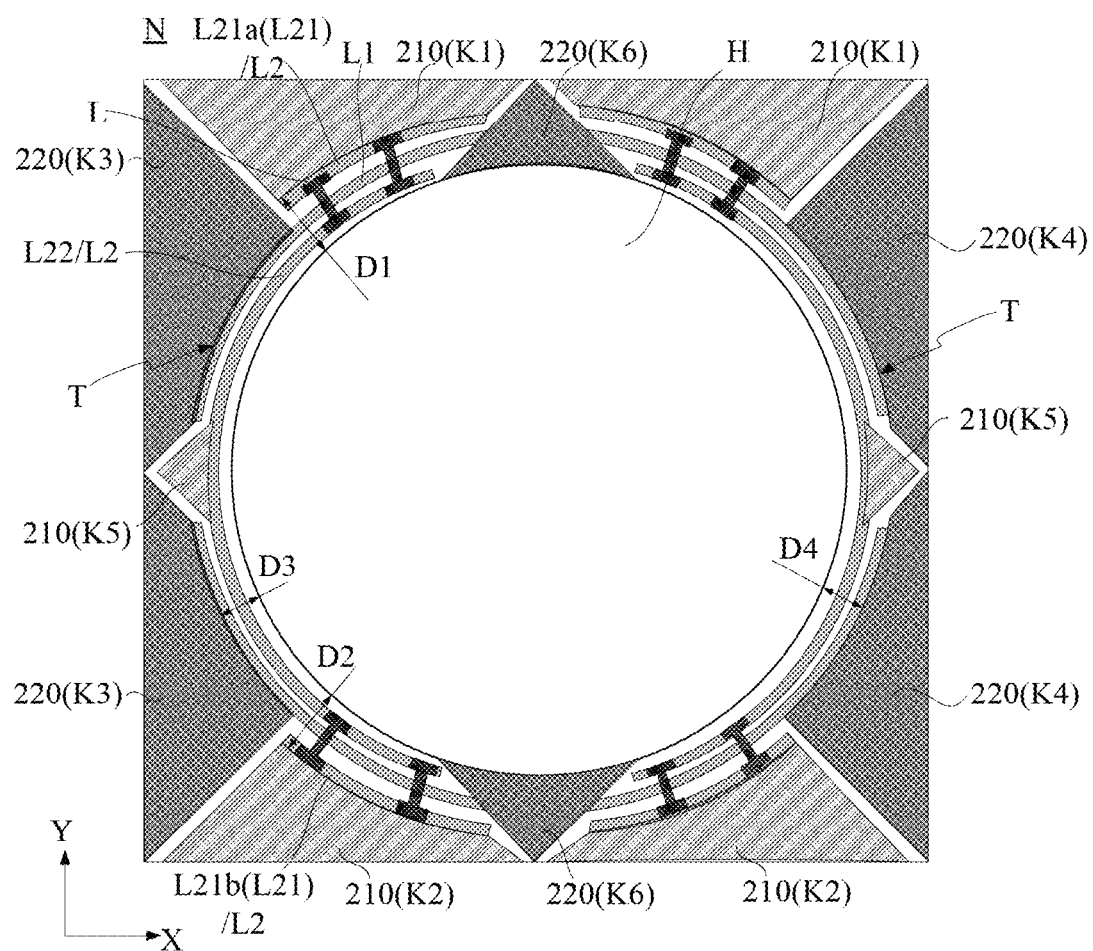
FIG. 9B is yet another partial enlarged view of the region N of the display panel in FIG. 3.

FIG. 9B is yet another partial enlarged view of the region N of the display panel in FIG. 3.

In some other embodiments, as shown in FIG. 9B, two first touch units 21 and two second touch units 22 all pass the installation hole H. The plurality of jumper structures T are disposed around the installation hole H. A first connection line L1 in a jumper structure T is directly connected to a third electrode K3 and a fourth electrode K4 in a same second touch unit 22, thereby achieving the normal connection between the third electrode K3 and the fourth electrode K4.

With continued reference to FIG. 9B, for the same jumper structure T, one of the two second connection lines L2 is referred to as a first target lead L21, and the other one of the two second connection lines L2 is referred to as a second target lead L22. The first target lead L21 includes a first line segment L21a and a second line segment L21B that are arranged separately. A first electrode K1 in a first touch unit 21 is directly connected to the first line segment L21a, and a second electrode K2 in the same first touch unit 21 is directly connected to the second line segment L21b. At least one connection pattern L crosses a first connection line L1 in a jumper structure T; an end of the connection pattern L is connected to the first line segment L21a, and the other end of the connection pattern L is connected to the second target lead L22. At least one connection pattern L crosses a first connection line L1 in another jumper structure T; an end of the connection pattern L is connected to the second target lead L22, and the other end of the connection pattern L is connected to the second line segment L21b. As a result, the normal connection between the first electrode K1 and the second electrode K2 is achieved.

In some embodiments, as shown in FIG. 9B, the first connection line L1 and the second connection lines L2 in the jumper structure T are disposed along the edge of the installation hole H, and length extending direction of the connection patterns L pass the installation hole H.

With such an arrangement, it may be possible to enable the arrangement of the jumper structure T to be compact, and reduce the area occupied by the jumper structure T at the periphery of the installation hole H. As a result, an area of the periphery of the installation hole H for arranging the touch electrodes is increased, and the facing area of side surfaces of the touch electrodes is increased, thereby helping improve the touch performance of the periphery of the installation hole H.

As shown in FIG. 9B, the distance D3 between the installation hole H and the edge of the third electrode K3 proximate to the installation hole H is less than the distance D1 between the installation hole H and the edge of the first electrode K1 proximate to the installation hole H, and is less than the distance D2 between the installation hole H and the edge of the second electrode K2 proximate to the installation hole H. The distance D4 between the installation hole H and the edge of the fourth electrode K4 proximate to the installation hole H is less than the distance D1 between the installation hole H and the edge of the first electrode K1 proximate to the installation hole H, and is less than the distance D2 between the installation hole H and the edge of the second electrode K2 proximate to the installation hole H.

In addition, the distance between the installation hole H and the first line segment L21a of the first target lead L21, the distance between the installation hole H and the first connection line L1, and the distance between the installation hole H and the second target lead L22 are sequentially decreased; and the distance between the installation hole H and the second line segment L21b of the first target lead L21, the distance between the installation hole H and another first connection line L1, and the distance between the installation hole H and the second target lead L22 are sequentially decreased.

It will be understood that, in combination with FIG. 9B, the distance between the installation hole H and the edge of the first electrode K1 proximate to the installation hole H. and the distance between the installation hole H and the edge of the second electrode K2 proximate to the installation hole H are larger; and the distance between the installation hole H and the edge of the third electrode K3 proximate to the installation hole H, and the distance between the installation hole H and the edge of the fourth electrode K4 proximate to the installation hole H are smaller. In addition, the distance between the installation hole H and the first target lead L21, the distance between the installation hole H and the first connection line L1, and the distance between the installation hole H and the second target lead L22 are sequentially decreased.

With such an arrangement, the edges, proximate to the installation hole H, of the first electrode K1 to the fourth electrode K4 are matched with the wiring arrangement of the first target lead L21, the first connection line L1 and the second target lead L22, thereby achieving a connection between the first target lead L21 and the first electrode K1, a connection between the first target lead L21 and the second electrode K2, a connection between the first connection line L1 and the third electrode K3 and a connection between the first connection line L1 and the fourth electrode K4, and avoiding the problem of short circuit due to crossing between the connection lines in the second conductive layer 2c.

In some embodiments, as shown in FIG. 9B, each first touch unit 21 further includes at least one fifth electrode K5 located at the periphery of the installation hole H. For example, each first touch unit 21 further includes one fifth electrode K5 located at the periphery of the installation hole H. That is, the installation hole H destroys the completeness of three first touch electrodes 210 (the first electrode K1, the second electrode K2 and the fifth electrode K5) in each first touch unit 21.

The fifth electrode K5 is located between the first electrode K1 and the second electrode K2 in the direction Y, and the fifth electrode K5 is connected to the second target lead L22. It is equivalent to the first electrode K1 being connected to the fifth electrode K5 through the first line segment L21a, at least one connection pattern L and the second target lead L22, and the fifth electrode K5 being connected to the second electrode K2 through the second target lead L22, at least one connection pattern L and the second line segment L21b.

The fifth electrode K5 is additionally arranged at the periphery of the installation hole H, and thus mutual capacitance is generated between the fifth electrode K5 and an adjacent third electrode K3, and mutual capacitance is generated between the fifth electrode K5 and an adjacent fourth electrode K4. As a result, it helps improve the touch performance of the periphery of the installation hole H.

As shown in FIG. 9B, each second touch unit 22 further includes at least one sixth electrode K6 located at the periphery of the installation hole H. For example, each second touch unit 22 further includes one sixth electrode K6 located at the periphery of the installation hole H. That is, the installation hole H destroys the completeness of three second touch electrodes 220 (the third electrode K3, the fourth electrode K4 and the sixth electrode K6) in each second touch unit 22.

The sixth electrode K6 is located between the third electrode K3 and the fourth electrode K4 in the direction X, and the sixth electrode K6 is connected to the first connection line L1. It is equivalent to the third electrode K3 being connected to the sixth electrode K6 through the first connection line L1, and the sixth electrode K6 being connected to the fourth electrode K4 through the first connection line L1.

The sixth electrode K6 is additionally arranged at the periphery of installation hole H, and thus mutual capacitance is generated between the sixth electrode K6 and an adjacent first electrode K1, and mutual capacitance is generated between the sixth electrode K6 and an adjacent second electrode K2. As a result, it helps improve the touch performance of the periphery of installation hole H.

In some embodiments, in combination with FIGS. 3 and 9B, areas of the first electrode K1, the second electrode K2, the third electrode K3 and the fourth electrode K4 are all less than an area of a touch electrode (the first touch electrode 210 or the second touch electrode 220) that is not penetrated by the installation hole H.

As can be seen from the above, compared with the touch electrode that is not penetrated by the installation hole H (a touch electrode with a complete pattern), the installation hole H destroys the completeness of patterns of the first electrode K1, the second electrode K2, the third electrode K3 and the fourth electrode K4, so that the areas of the first electrode K1, the second electrode K2, the third electrode K3 and the fourth electrode K4 are all less than the area of the touch electrode that is not penetrated by the installation hole H.

In addition, for the same first touch unit 21, an area of the fifth electrode K5 is less than an area of the first electrode K1, and is less than an area of the second electrode K2. That is, the fifth electrode K5 with a relatively small area is added, and the fifth electrode K5 may fill a region around the installation hole H, which improves the area utilization rate of the region around the installation hole H. In addition, mutual capacitance is generated between the fifth electrode K5 and the adjacent third electrode K3, and mutual capacitance is generated between the fifth electrode K5 and the adjacent fourth electrode K4, thereby helping improve the touch performance of the periphery of the installation hole H.

Similarly, for the same second touch unit 22, an area of the sixth electrode K6 is less than an area of the third electrode K3, and is less than an area of the fourth electrode K4. That is, the sixth electrode K6 with a relatively small area is added, and the sixth electrode K6 may fill the region around the installation hole H, which improves the area utilization rate of the region around the installation hole H. In addition, mutual capacitance is generated between the sixth electrode K6 and the adjacent first electrode K1, and mutual capacitance is generated between the sixth electrode K6 and the adjacent second electrode K2, thereby helping improve the touch performance of the periphery of the installation hole H.

Figure 10:
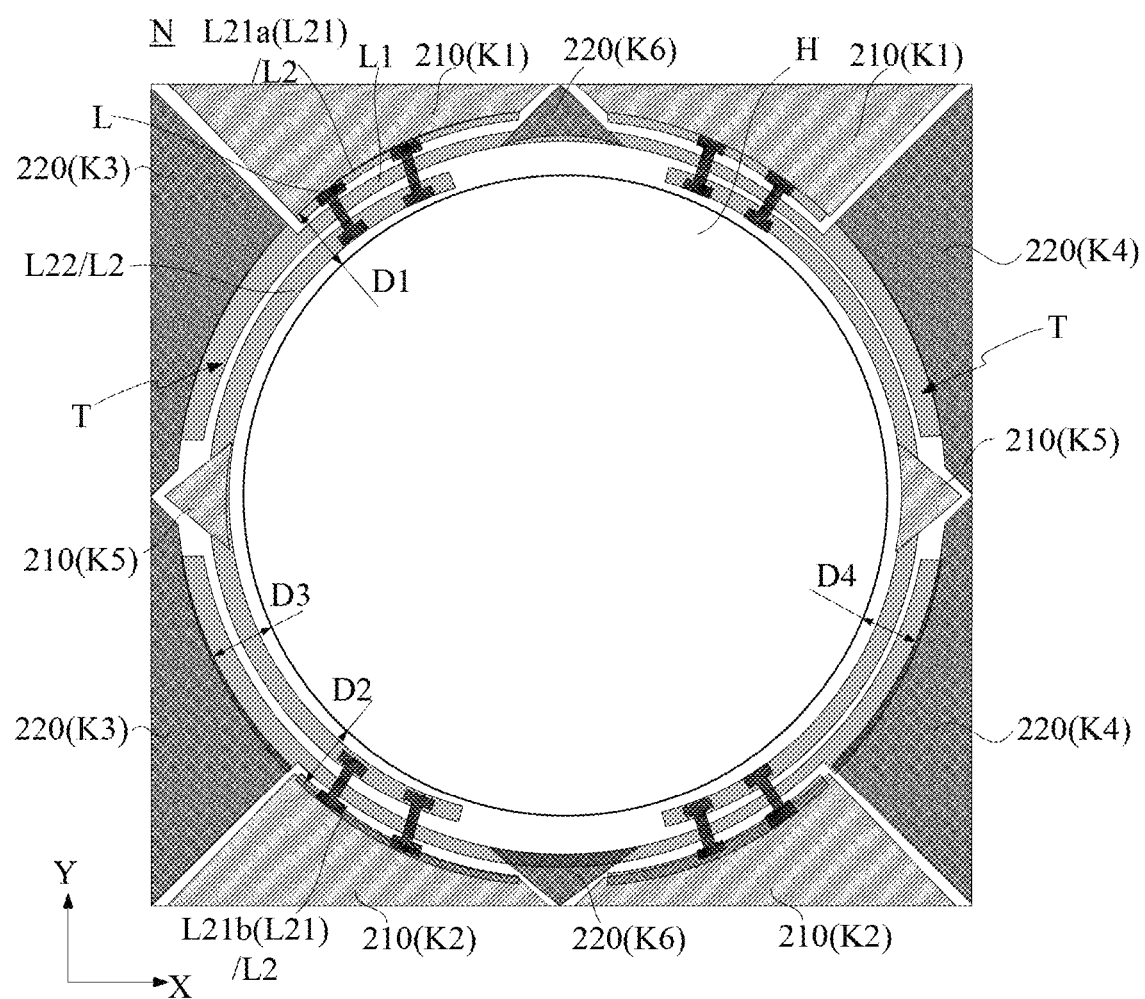
FIG. 10 is yet another partial enlarged view of the region N of the display panel in FIG. 3.

FIG. 10 is yet another partial enlarged view of the region N of the display panel in FIG. 3.

Referring to FIG. 10, the distance D1 between the installation hole H and the edge of the first electrode K1 proximate to the installation hole H, the distance D2 between the installation hole H and the edge of the second electrode K2 proximate to the installation hole H, the distance D3 between the installation hole H and the edge of the third electrode K3 proximate to the installation hole H, and the distance D4 between the installation hole H and the edge of the fourth electrode K4 proximate to the installation hole H are equal to each other.

In addition, a distance between the installation hole H and the first line segment L21a of the first target lead L21, a distance between the installation hole H and the first connection line L1, and a distance between the installation hole H and the second target lead L22 are sequentially decreased, and a distance between the installation hole H and the second line segment L21b of the first target lead L21, a distance between the installation hole H and another first connection line L1, and a distance between the installation hole H and the second target lead L22 are sequentially decreased.

With reference to FIG. 10, a line width of the first connection line L1 is varied. It is assumed that, a line width of a portion of the first connection line L1 located between the second touch electrode 220 (the third electrode K3 or the fourth electrode K4) and the installation hole H is G1, and a line width of a portion of the first connection line L1 located between the first touch electrode 210 (the first electrode K1 or the second electrode K2) and the installation hole H is G2, G1 is greater than G2 (G1>G2).

Based on this, it is assumed that, a line width of the first line segment L21a is G3, and a distance between the first line segment L21a and the first connection line L1 is G4. Thus, G1 is equal to a sum of G2, G3 and G4 (G1=G2+G3+G4). It is assumed that, a line width of the second line segment L21b is G5, and a distance between the second line segment L21b and the first connection line L1 is G6. Thus, G1 is equal to a sum of G2, G5 and G6 (G1=G2+G5+G6).

With such an arrangement, the edges, proximate to the installation hole H. of the first electrode K1 to the fourth electrode K4 are matched with the wiring arrangement of the first target lead L21, the first connection line L1 and the second target lead L22, thereby achieving a connection between the first target lead L21 and the first electrode K1, a connection between the first target lead L21 and the second electrode K2, a connection between the first connection line L1 and the third electrode K3 and a connection between the first connection line L1 and the fourth electrode K4, and avoiding the problem of short circuit due to crossing between connection lines in the second conductive layer 2c.

Figure 11A:
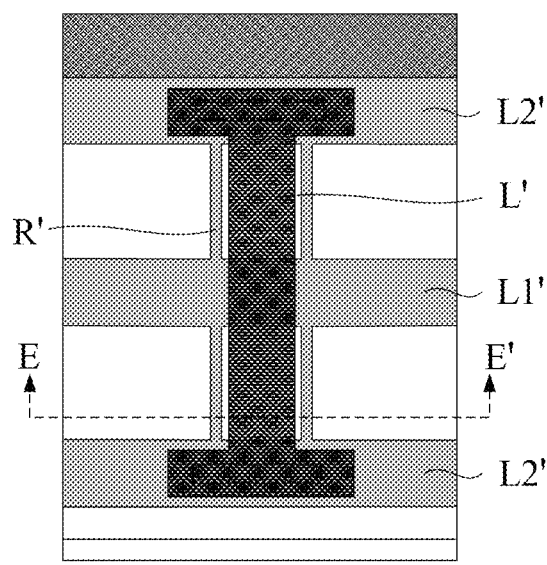
FIG. 11A is a structural diagram of a touch structure in the related art.
Figure 11B:
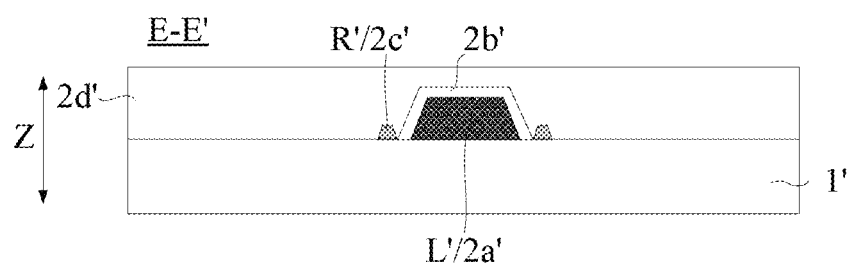
FIG. 11B is a sectional view of a display panel in FIG. 11A taken along the section line E-E'.

However, in the related art, FIG. 11A is a structural diagram of a touch structure in the related art; FIG. 11B is a sectional view of a display panel in FIG. 11A taken along the section line E-E'; and FIGS. 12A and 12B each are a diagram illustrating a step for fabricating a jumper structure in the related art.

Referring to FIGS. 11A and 11B, conductive lines R' exists in a second conductive layer 2c', a length extending direction of the conductive line R' is substantially parallel to a length extending direction of a connection pattern L', and the conductive line R' approaches a bottom chamfer of the connection pattern L'. The conductive line R' is connected to a first connection line L1' and a second connection line L2', which causes a short circuit between a touch electrode connected to the first connection line L1' and a touch electrode connected to the second connection line L2', and thus affect the touch performance of the touch structure.

The inventors of the present disclosure have found through research that, the reason why the conductive lines R' exist in the second conductive layer 2c' is as follows.

For a display substrate 1', an organic barrier layer of a thin film encapsulation layer is usually fabricated by an ink-jet printing (IJP) technology. Since the ink has fluidity, a surface of the ink close to an installation hole is relatively low and uneven; after the Ink is dried, a portion of the organic barrier layer close to the installation hole is thin, and has an uneven surface, which causes an upper surface of the display substrate 1' to be uneven.

Figure 12A:
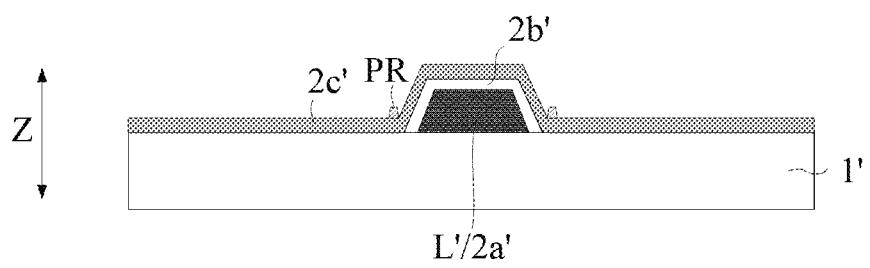
FIGS. 12A and 12B each are a diagram illustrating a steps for fabricating a jumper structure in the related art.
Figure 12B:
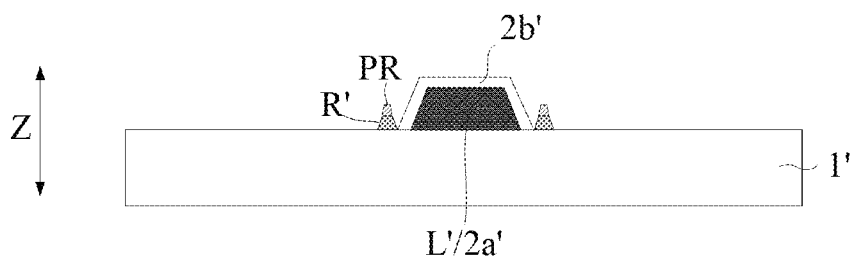

In a process of fabricating the jumper structure T', referring to FIGS. 12A and 12B, the connection pattern L', an insulating layer 2b', the second conductive layer 2c' and a photoresist layer PR are sequentially formed on the display substrate 1'; and then the photoresist layer PR is exposed and developed to form a patterned photoresist layer PR. Since the bottom chamfer of the connection pattern L' is recessed and the upper surface of the display substrate 1' is uneven, portions of the photoresist layer PR are likely to remain near the bottom chamfer of the connection pattern L'. Thus, in the process of patterning the second conductive layer 2c' by using the photoresist layer PR as a mask, residual materials of the second conductive layer 2c' exist under the remaining portions of the photoresist layer PR. That is, the conductive lines R' are formed.

Figure 13A:
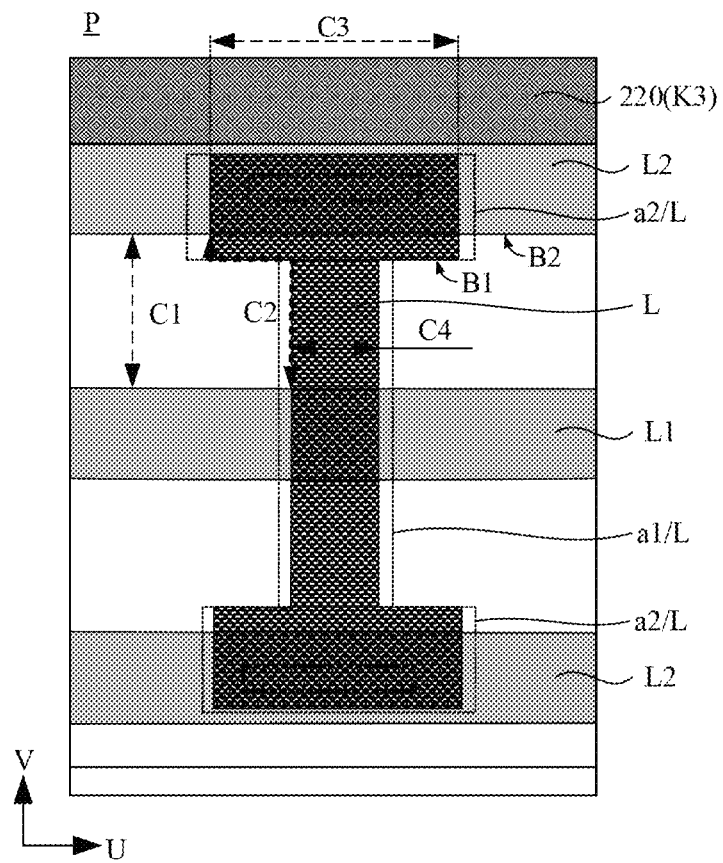
FIGS. 13A and 13B each are a structural diagram of a touch structure, in accordance with some embodiments.
Figure 13B:
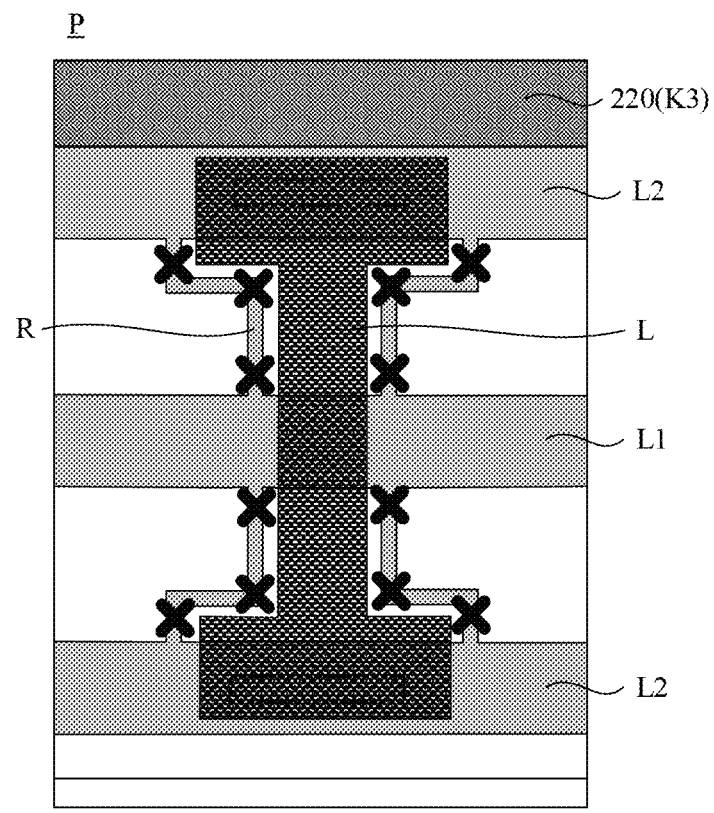

To solve the problem above, some embodiments of the present disclosure provide a touch structure 2, and FIGS. 13A and 13B each are a structural diagram of the touch structure, in accordance with some embodiments.

As shown in FIG. 13A, for the jumper structure T of the touch structure 2, a distance between the first connection line L1 and the second connection line L2 is a first dimension C1. For a portion of the connection pattern L located between the first connection line L1 and the second connection line L2, a length of a contour from the first connection line L1 to the second connection line L2 is a second dimension C2, and the second dimension C2 is greater than the first dimension C1.

In the embodiments of the present disclosure, the length C2 of the contour of the portion of the connection pattern L located between the first connection line L1 and the second connection line L2 is greater than the distance C1 between the first connection line L1 and the second connection line L2, which increases the length C2 of the contour of the portion of the connection pattern L located between the first connection line L1 and the second connection line L2 compared with the jumper structure shown in FIG. 11A.

Based on this, in the process of fabricating the jumper structure T, referring to FIG. 13B, as the length C2 of the contour of the portion of the connection pattern L increases, a length of a conductive line R increases. Thus, a disconnection is easily happened to the conductive line R, which reduces a risk that the conductive line R is connected to the first connection line L1 and the second connection line L2, and thus reduces the risk of short circuit between the touch electrodes.

In some embodiments, referring to FIG. 13A, the connection pattern L includes a first connection portion a1 and two first conductive portions a2 disposed at two ends of the first connection portion a1. In a first direction U, a dimension C3 of the first conductive portion a2 is greater than a dimension C4 of the first connection portion a1.

It will be noted that the "first direction U" is substantially parallel to the extending direction of the first connection line L1. In a case where the first connection line L1 is curved, the "first direction U" may be substantially parallel to a tangential direction of the first connection line L1.

With continued reference to FIG. 13A, the first connection portion a1 of the connection pattern L crosses the first connection line L1; the two first conductive portions a2 correspond to the two second connection lines L2, respectively, and each first conductive portion a2 passes through the insulating layer 2b to be connected to a corresponding second connection line L2. An edge B1 of the first conductive portion a2 proximate to the first connection line L1 exceeds an edge B2 of the corresponding second connection line L2 proximate to the first connection line L1.

In the embodiments of the present disclosure, by arranging the edge B1 of the first conductive portion a2 to exceed the edge B2 of the corresponding second connection line L2, it may be possible to increase the length C2 of the contour of the portion of the connection pattern L located between the first connection line L1 and the second connection line L2. As a result, the risk of short circuit between the first connection line L1 and the second connection line L2 is reduced, and thus the risk of short circuit between the touch electrodes is reduced.

Figure 14A:
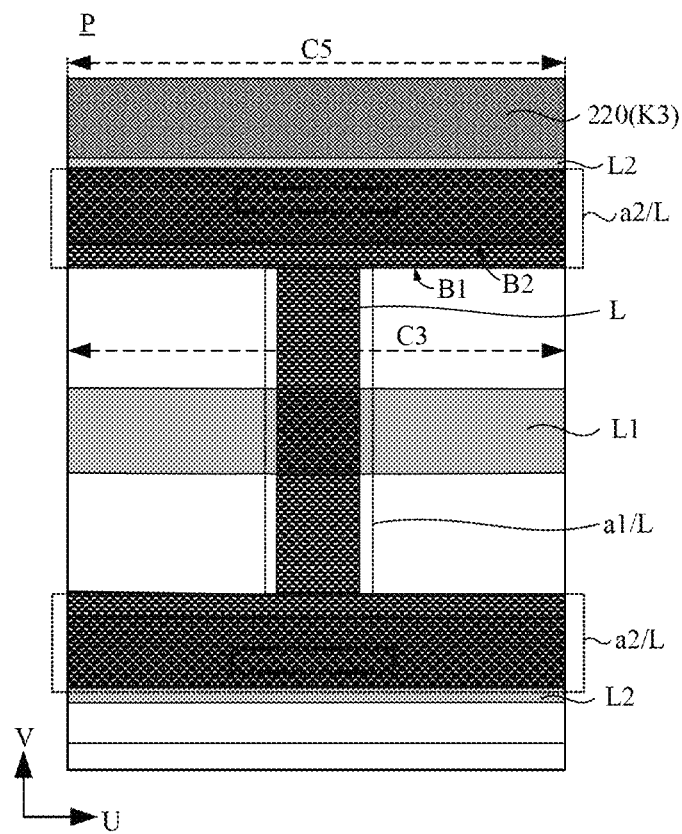
FIGS. 14A and 14B each are a structural diagram of another touch structure, in accordance with some embodiments.
Figure 14B:
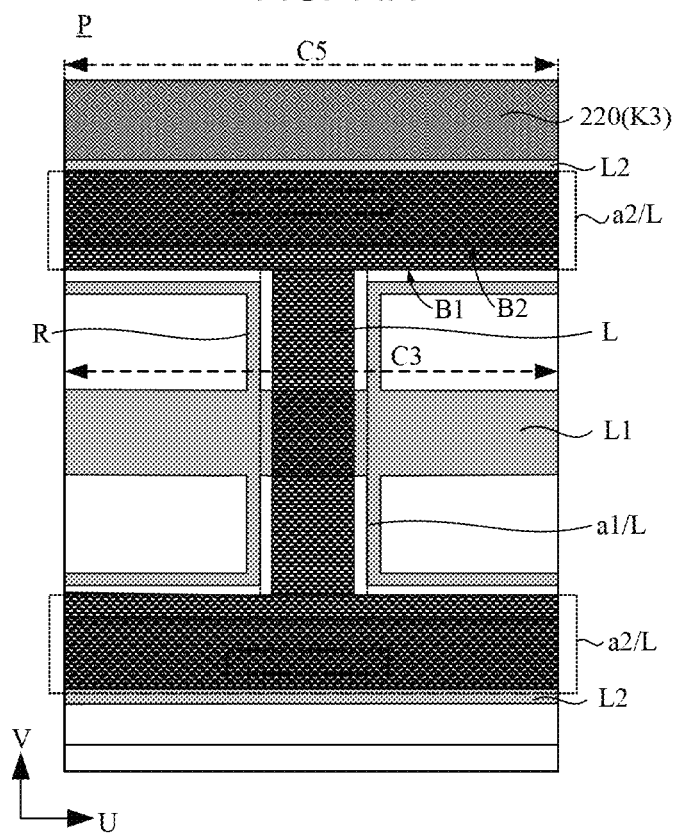

FIGS. 14A and 14B each are a structural diagram of another touch structure, in accordance with some embodiments.

In some embodiments, as shown in FIG. 14A, the edge B1 of the first conductive portion a2 proximate to the first connection line L1 exceeds the edge B2 of the corresponding second connection line L2 proximate to the first connection line L1.

In addition, in the first direction U, a dimension C3 of at least one first conductive portion a2 is substantially equal to a dimension C5 of a corresponding second connection line L2. For example, in the first direction U, dimensions C3 of two first conductive portions a2 are substantially equal to dimensions C5 of respective second connection lines L2. Therefore, overlapped wirings in two layers are formed by the first conductive portions a2 and the second connection lines L2.

In the embodiments of the present disclosure, in the first direction U, the dimension C3 of the first conductive portion a2 is substantially equal to the dimension C5 of the corresponding second connection line L2, so that a length of the edge B1 of the first conductive portion a2 is substantially equal to a length of the edge B2 of the corresponding second connection line L2.

Referring to FIG. 14B, since the edge B1 of the first conductive portion a2 exceeds the edge B2 of the corresponding second connection line L2, and the length of the edge B1 of the first conductive portion a2 is substantially equal to the length of the edge B2 of the corresponding second connection line L2, the edge B1 of the first conductive portion a2 does not overlap with the edge B2 of the corresponding second connection line L2. As a result, the conductive line R is not in contact with and connected to the second connection line L2 in the process of fabricating the jumper structure T, thereby further reducing the risk of short circuit between the touch electrodes.

In some embodiments, as shown in FIGS. 13A and 14A, the edge B1 of the first conductive portion a2 proximate to the first connection line L1 exceeds the edge B2 of the corresponding second connection line L2 proximate to the first connection line L1.

In addition, the edge B1 of at least one first conductive portion a2 proximate to the first connection line L1 is substantially parallel to the edge B2 of the corresponding second connection line L2 proximate to the first connection line L1. For example, edges B1 of two first conductive portions a2 proximate to the first connection line L1 are substantially parallel to edges B2 of respective second connection lines L2 proximate to the first connection line L1.

With such an arrangement, the edge B1 of the first conductive portion a2 exceeds the edge B2 of the corresponding second connection line L2, and the edge B1 of the first conductive portion a2 is substantially parallel to the edge B2 of the corresponding second connection line L2, which helps increase the length C2 of the contour of the portion of the connection pattern L located between the first connection line L1 and the second connection line L2. As a result, the risk of short circuit between the first connection line L1 and the second connection line L2 is reduced, and thus the risk of short circuit between the touch electrodes is reduced.

In addition, in a case where the length of the edge B1 of the first conductive portion a2 is substantially equal to the length of the edge B2 of the corresponding second connection line L2, the conductive line R is ensured not to be in contact with and connected to the second connection line L2, so that the risk of short circuit between the touch electrodes may be further reduced.

It will be seen that, in each of the designs of the jumper structure T, the edge B1 of the first conductive portion a2 should be ensured to exceed the edge B2 of the corresponding second connection line L2. Therefore, the inventors of the present disclosure have done research on the fabricating process of the jumper structure T and found that, dimensional tolerances of the connection pattern L and the second connection line L2, and positional tolerances of the connection pattern L and the second connection line L2 should be considered when the condition above is satisfied.

As shown in FIGS. 13A and 14A, it is assumed that, an average distance between the edge B1 of at least one first conductive portion a2 proximate to the first connection line L1 and the edge B2 of the corresponding second connection line L2 proximate to the first connection line L1 is D.

It is assumed that a dimensional tolerance of the first conductive portion a2 in a second direction V is $CD_1$, it will be noted that the "second direction V" is substantially perpendicular to the extending direction of the first connection line L1. In the case where the first connection line L1 is curved, the "second direction V" may be substantially perpendicular to the tangential direction of the first connection line L1. A positional tolerance of the first conductive portion a2 is $OL_1$.

It is assumed that, a dimensional tolerance of the second connection line L2 in the second direction V is $CD_2$, and a positional tolerance of the second connection line L2 is $OL_2$.

In a case where a vacant area of the periphery of the installation hole H is relatively large, a dimension of the edge B1 of the first conductive portion a2 exceeding the edge B2 of the corresponding second connection line L2 may be relatively large. That is, the average distance D between the edge B1 of the first conductive portion a2 and the edge B2 of the corresponding second connection line L2 may be relatively large. Based on this, a condition that should be satisfied is as follows:

$$D > \frac{CD_1}{2} + OL_1 + \frac{CD_2}{2} + OL_2.$$

In a case where the vacant area of the periphery of the installation hole H is relatively small, the dimension of the edge B1 of the first conductive portion a2 exceeding the edge B2 of the corresponding second connection line L2 needs to be relatively small. That is, the average distance D between the edge B1 of the first conductive portion a2 and the edge B2 of the corresponding second connection line L2 needs to be relatively small. Based on this, a condition that should be satisfied is as follows:

$$D > \sqrt{\left(\frac{CD_1}{2}\right)^2 + OL_1^2 + \left(\frac{CD_2}{2}\right)^2 + OL_2^2}.$$

Figure 15A:
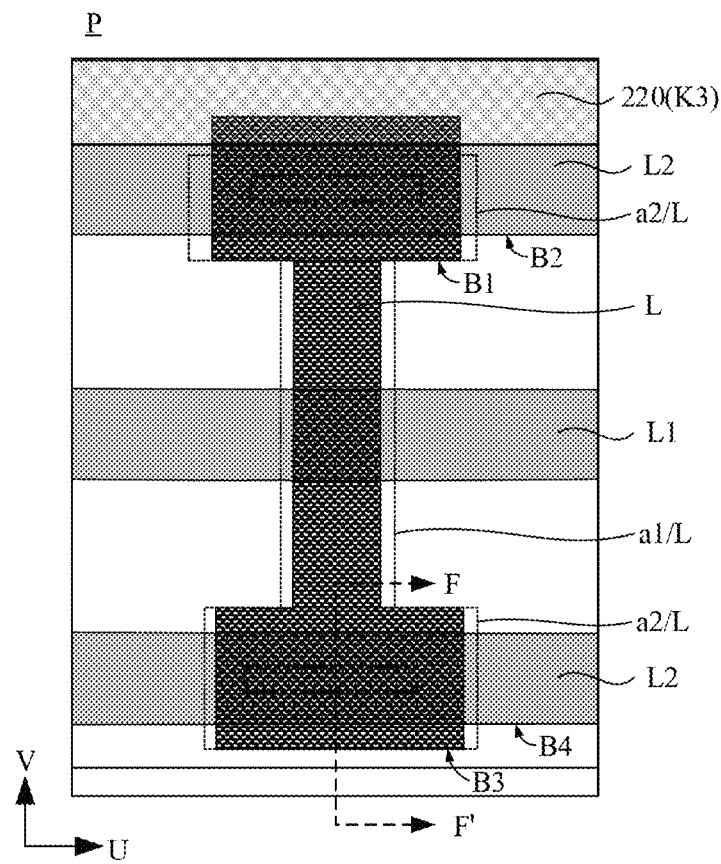
FIG. 15A is a structural diagram of another touch structure, in accordance with some embodiments.
Figure 15B:
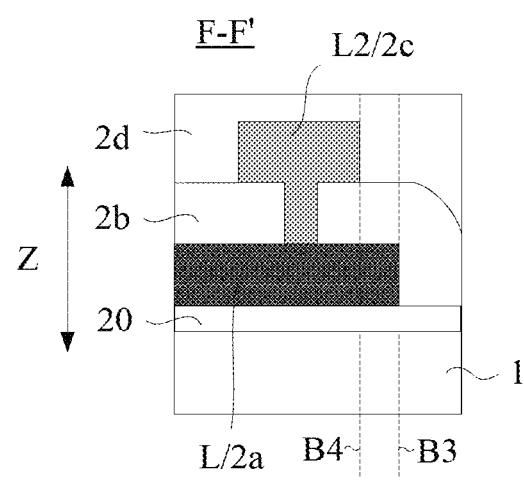
FIG. 15B is a sectional view of the touch structure in FIG. 15A taken along the section line F-F'.

FIG. 15A is a structural diagram of another touch structure, in accordance with some embodiments; FIG. 15B is a sectional view of the touch structure in FIG. 15A taken along the section line F-F'.

As shown in FIG. 15A, an edge B3 of at least one first conductive portion a2 away from the first connection line L1 exceeds an edge B4 of the corresponding second connection line L2 away from the first connection line L1.

For example, edges B3 of two first conductive portions a2 away from the first connection line L1 exceed edges B4 of respective second connection lines L2 away from the first connection line L1.

It will be understood that, referring to FIG. 15B, the edge B1 of the first conductive portion a2 proximate to the first connection line L1 exceeds the edge B2 of the corresponding second connection line L2 proximate to the first connection line L1. Based on this, the edge B3 of the first conductive portion a2 away from the first connection line L1 exceeds the edge B4 of the corresponding second connection line L2 away from the first connection line L1, so that a surface of the insulating layer 2b that covers the first conductive portion a2 may be flatter. In the process of fabricating the second connection line L2, the second connection line L2 is formed on the flat surface, which helps reduce the dimensional tolerance of the second connection line L2 and improve the dimensional precision of the second connection line L2.

Figure 16A:
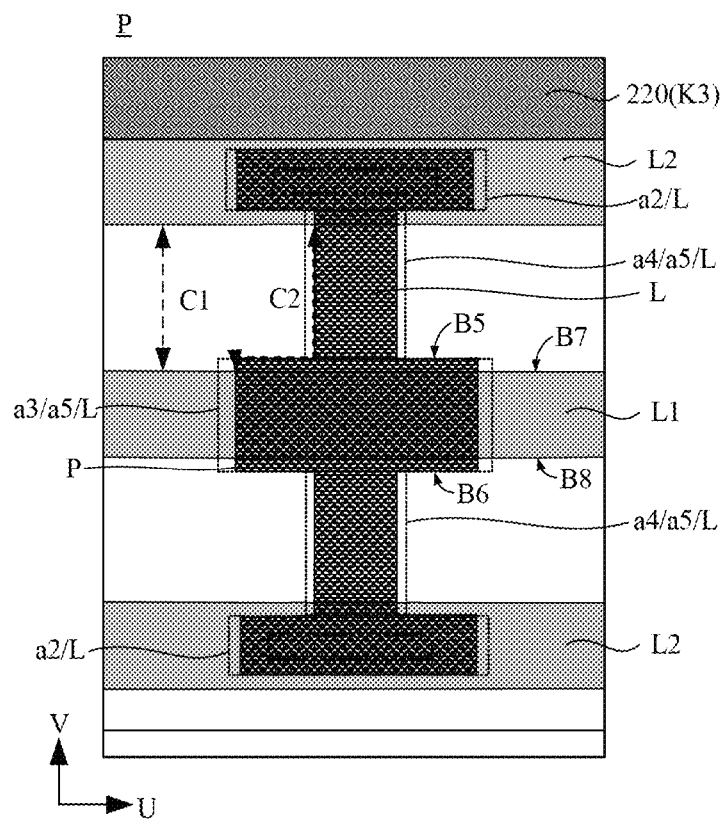
FIGS. 16A and 16B each are a structural diagram of another touch structure, in accordance with some embodiments.
Figure 16B:
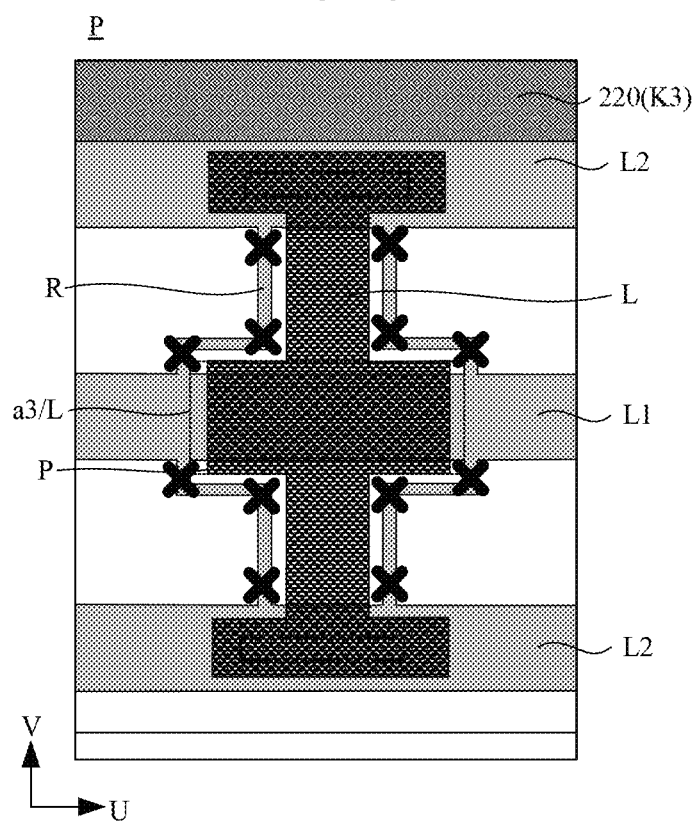

FIGS. 16A and 16B each are a structural diagram of another touch structure, in accordance with some embodiments.

As shown in FIG. 16A, the connection pattern L includes a second conductive portion a3, and an orthographic projection of the first connection line L1 on a reference plane P overlaps with an orthographic projection of the second conductive portion a3 on the reference plane P. It will be noted that the "reference plane P" is a plane in which the first conductive layer 2a is located.

Opposite edges of the second conductive portion a3 in the second direction V are a first edge B5 and a second edge B6, and opposite edges of the first connection line L1 in the second direction V are a third edge B7 and a fourth edge B8. The first edge B5 corresponds to the third edge B7, and the first edge B5 exceeds the third edge B7. The second edge B6 corresponds to the fourth edge B8, and the second edge B6 exceeds the fourth edge B8.

In the embodiments of the present disclosure, by arranging the edge B5 of the second conductive portion a3 to exceed the edge B7 of the first connection line L1 and arranging the edge B6 of the second conductive portion a3 exceed the edge B8 of the first connection line L1, it may be possible to enable the length C2 of the contour of the portion of the connection pattern L located between the first connection line L1 and the second connection line L2 to be greater than the distance C1 between the first connection line L1 and the second connection line L2, thereby increasing the length C2 of the contour of the portion of the connection pattern L located between the first connection line L1 and the second connection line L2 compared with the jumper structure shown in FIG. 11A.

Based on this, in the process of fabricating the jumper structure T, referring to FIG. 16B, as the length C2 of the contour of the portion of the connection pattern L increases, the length of the conductive line R increases. Thus, a disconnection is easily happened to the conductive line R, which reduces the risk that the conductive line R is connected to the first connection line L1 and the second connection line L2, and thus reduces the risk of short circuit between the touch electrodes.

Figure 17A:
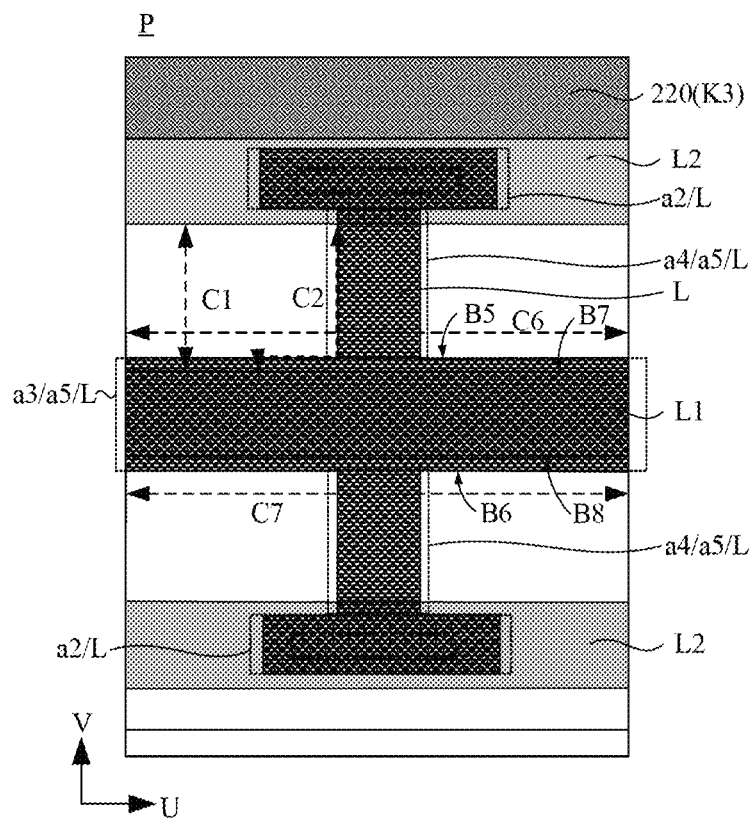
FIGS. 17A and 17B each are a structural diagram of yet another structure, in accordance with some embodiments.
Figure 17B:
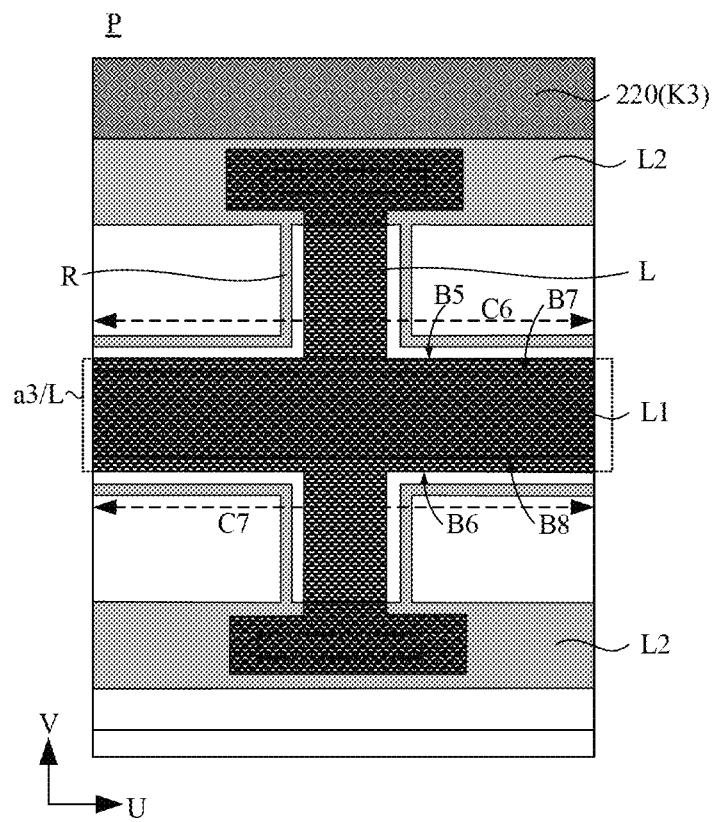

FIGS. 17A and 17B each are a structural diagram of yet another touch structure, in accordance with some embodiments.

As shown in FIG. 17A, the first edge B5 of the second conductive portion a3 exceeds the third edge B7 of the first connection line L1, and the second edge B6 of the second conductive portion a3 exceeds the fourth edge B8 of the first connection line L1.

In addition, in the first direction U, a dimension C6 of the second conductive portion a3 is substantially equal to a dimension C7 of the first connection line L1. Therefore, overlapped wirings in two layers are formed by the second conductive portion a3 and the first connection line L1.

In the embodiments of the present disclosure, in the first direction U, the dimension C6 of the second conductive portion a3 is substantially equal to the dimension C7 of the first connection line L1, so that a length of the first edge B5 of the second conductive portion a3 is substantially equal to a length of the third edge B7 of the first connection line L1, and a length of the second edge B6 of the second conductive portion a3 is substantially equal to a length of the fourth edge B8 of the first connection line L1.

Referring to FIG. 17B, since the first edge B5 of the second conductive portion a3 exceeds the third edge B7 of the first connection line L1, and the length of the first edge B5 is substantially equal to the length of the third edge B7, the first edge B5 does not overlap with the third edge B7. As a result, the conductive line R is not in contact with and connected to the first connection line L1 in the process of fabricating the jumper structure T, thereby further reducing the risk of short circuit between the touch electrodes.

In addition, since the second edge B6 of the second conductive portion a3 exceeds the fourth edge B8 of the first connection line L1, and the length of the second edge B6 is substantially equal to the length of the fourth edge B8, the second edge B6 does not overlap with the fourth edge B8. As a result, the conductive line R is not in contact with and connected to the first connection line L1 in the process of fabricating the jumper structure T, thereby further reducing the risk of short circuit between the touch electrodes.

In some embodiments, as shown in FIGS. 16A and 17A, the first edge B5 of the second conductive portion a3 exceeds the third edge B7 of the first connection line L1, and the first edge B5 is substantially parallel to the third edge B7.

With such an arrangement, the first edge B5 of the second conductive portion a3 exceeds the third edge B7 of the first connection line L1, and the first edge B5 is substantially parallel to the third edge B7, which helps increase the length C2 of the contour of the portion of the connection pattern L located between the first connection line L1 and one second connection line L2. As a result, the risk of short circuit between the first connection line L1 and the second connection line L2 is reduced, and thus the risk of short circuit between the touch electrodes is reduced.

In addition, in the case where the length of the first edge B5 is substantially equal to the length of the third edge B7, the conductive line R is ensured not to be in contact with and connected to the first connection line L1, so that the risk of short circuit between the touch electrodes may be further reduced.

In some embodiments, as shown in FIGS. 16A and 17A, the second edge B6 of the second conductive portion a3 exceeds the fourth edge B8 of the first connection line L1, and the second edge B6 is substantially parallel to the fourth edge B8.

With such an arrangement, the second edge B6 of the second conductive portion a3 exceeds the fourth edge B8 of the first connection line L1, and the second edge B6 is substantially parallel to the fourth edge B8, which helps increase the length C2 of the contour of the portion of the connection pattern L located between the first connection line L1 and one second connection line L2. As a result, the risk of short circuit between the first connection line L1 and the second connection line L2 is reduced, and thus the risk of short circuit between the touch electrodes is reduced.

In addition, in the case where the length of the second edge B6 is substantially equal to the length of the fourth edge B8, the conductive line R is ensured not to be in contact with and connected to the first connection line L1, so that the risk of short circuit between the touch electrodes may be further reduced.

In some embodiments, as shown in FIGS. 16A and 17A, the first edge B5 of the second conductive portion a3 exceeds the third edge B7 of the first connection line L1, and the first edge B5 is substantially parallel to the third edge B7; the second edge B6 of the second conductive portion a3 exceeds the fourth edge B8 of the first connection line L1, and the second edge B6 is substantially parallel to the fourth edge B8. As a result, it may be possible to reduce the risk of short circuit between the first connection line L1 and the two second connection lines L2, and thus reduce the risk of short circuit between the touch electrodes.

In some embodiments, as shown in FIGS. 16A and 17A, the connection pattern L includes: two first conductive portions a2, the second conductive portion a3, and two second connection portions a4. A first conductive portion a2 is connected to the second conductive portion a3 through a second connection portion a4, and the second conductive portion a3 is connected to another first conductive portion a2 through another second connection portion a4.

For example, the second conductive portion a3 and the two second connection portions a4 constitute a crossover portion a5, and the crossover portion a5 crosses the first connection line L1. The first conductive portions a2 pass through the insulating layer 2b to be connected to respective second connection lines L2.

It will be seen that, in each of the designs of the jumper structure T, the first edge B5 of the second conductive portion a3 should be ensured to exceed the third edge B7 of the first connection line L1, and the second edge B6 of the second conductive portion a3 should be ensured to exceed the fourth edge B8 of the first connection line L1.

As described above, it is assumed that an average distance between the first edge B5 of the second conductive portion a3 and the third edge B7 of the first connection line L1 is D', and an average distance between the second edge B6 of the second conductive portion a3 and the fourth edge B8 of the first connection line L1 is D'.

It is assumed that, a dimensional tolerance of the second conductive portion a3 in the second direction V is $CD_1'$, and a positional tolerance of the second conductive portion a3 is $OL_1'$.

It is assumed that, a dimensional tolerance of the first connection line L1 in the second direction V is $CD_2'$, and a positional tolerance of the first connection line L1 is $OL_2'$.

In the case where the vacant area of the periphery of the installation hole H is relatively large, a dimension of the first edge B5 of the second conductive portion a3 exceeding the third edge B7 of the first connection line L1, and a dimension of the second edge B6 of the second conductive portion a3 exceeding the fourth edge B8 of the first connection line L1 may be set relatively large. That is, the average distance D' between the first edge B5 and the third edge B7, and the average distance D' between the second edge B6 and the fourth edge B8 may be relatively large. Based on this, a condition that should be satisfied is as follows:

$$D' > \frac{CD_1'}{2} + OL_1' + \frac{CD_2'}{2} + OL_2'.$$

In the case where the vacant area of the periphery of the installation hole H is relatively small, the dimension of the first edge B5 of the second conductive portion a3 exceeding the third edge B7 of the first connection line L1, and the dimension of the second edge B6 of the second conductive portion a3 exceeding the fourth edge B8 of the first connection line L1 need to be relatively small. That is, the average distance D' between the first edge B5 and the third edge B7, and the average distance D' between the second edge B6 and the fourth edge B8 need to be relatively small. Based on this, a condition that should be satisfied is as $$D' > \sqrt{\left(\frac{CD_1'}{2}\right)^2 + OL_1'^2 + \left(\frac{CD_2'}{2}\right)^2 + OL_2'^2}.$$

Figure 18A:
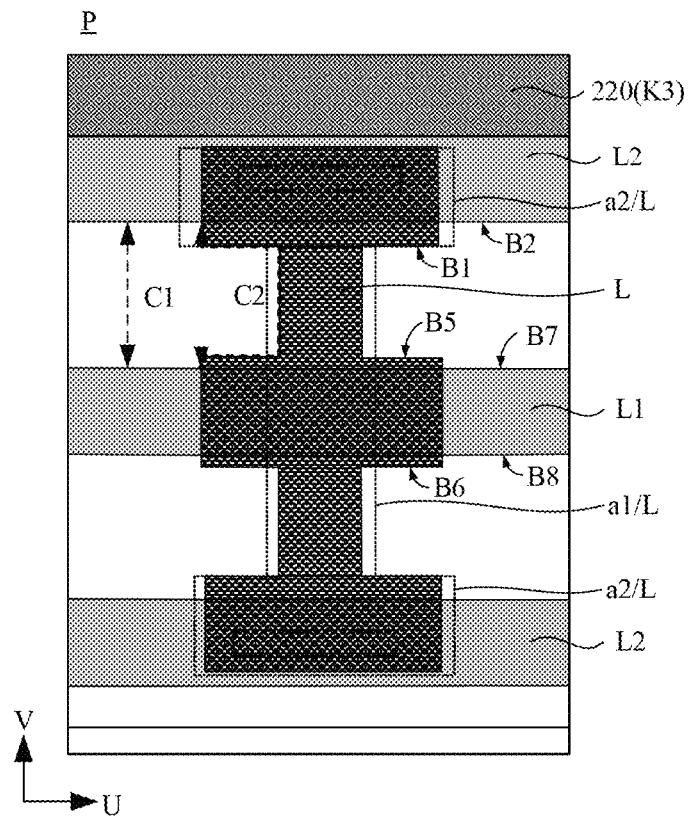
FIGS. 18A and 18B each are a structural diagram of yet another structure, in accordance with some embodiments.
Figure 18B:
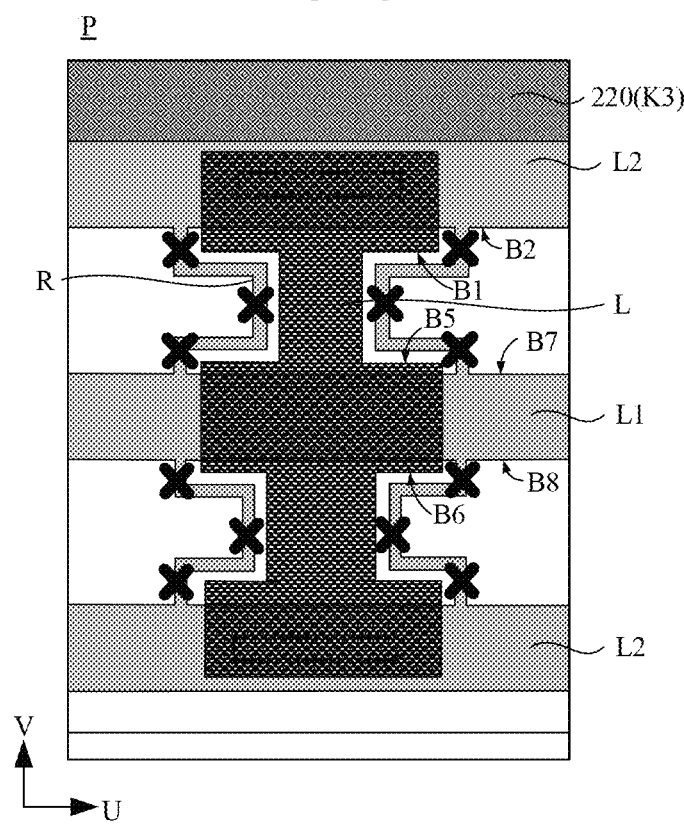

FIGS. 18A and 18B each are a structural diagram of yet another touch structure, in accordance with some embodiments.

As shown in FIG. 18A, the edge B1 of the first conductive portion a2 proximate to the first connection line L1 exceeds the edge B2 of the corresponding second connection line L2 proximate to the first connection line L1; the first edge B5 of the second conductive portion a3 exceeds the third edge B7 of the first connection line L1, and the second edge B6 exceeds the fourth edge B8 of the first connection line L1. As a result, it may be possible to further increase the length C2 of the contour of the portion of the connection pattern L located between the first connection line L1 and the second connection line L2.

Based on this, in the process of fabricating the jumper structure T, referring to FIG. 18B, as the length C2 of the contour of the portion of the connection pattern L increases, the length of the conductive line R increases. Thus, a disconnection is easily happened to the conductive line R, which reduces the risk that the conductive line R is connected to the first connection line L1 and the second connection line L2, and thus reduces the risk of short circuit between the touch electrodes.

Figure 19A:
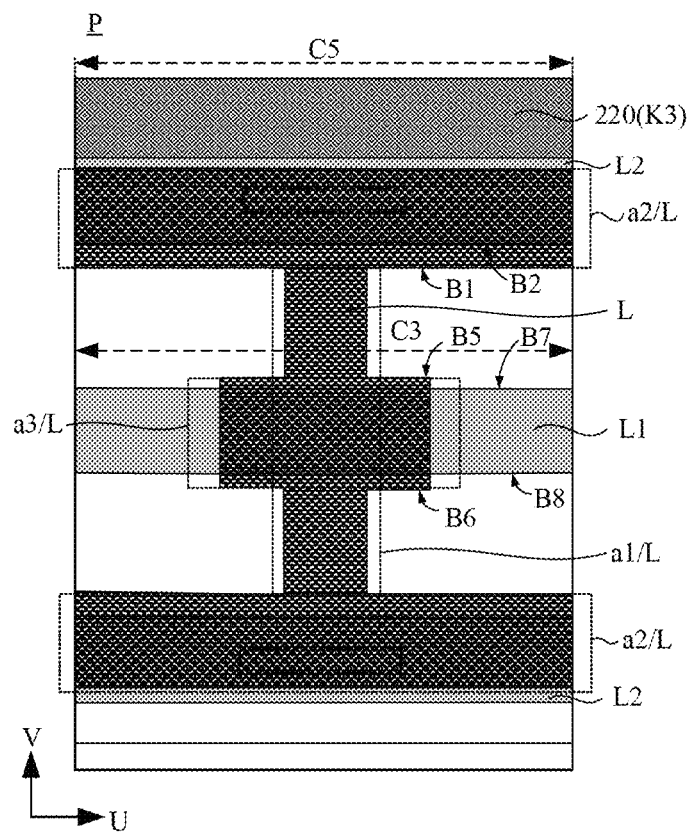
FIGS. 19A and 19B each are a structural diagram of yet another structure, in accordance with some embodiments.
Figure 19B:
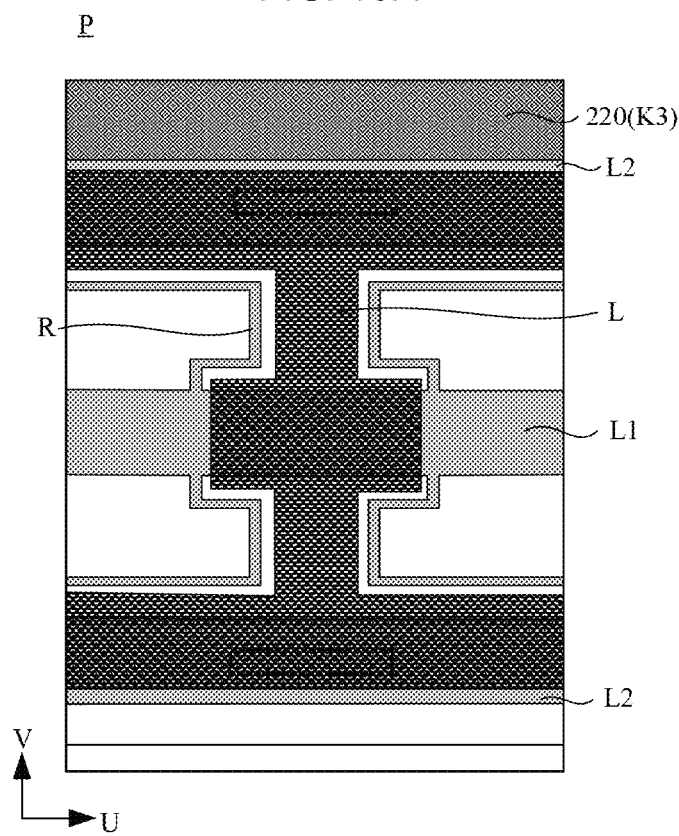

FIGS. 19A and 19B each are a structural diagram of yet another touch structure, in accordance with some embodiments.

As shown in FIG. 19A, the edge B1 of the first conductive portion a2 proximate to the first connection line L1 exceeds the edge B2 of the corresponding second connection line L2 proximate to the first connection line L1. In the first direction U, dimensions C3 of the two first conductive portions a2 are substantially equal to the dimensions C5 of respective second connection lines L2. Therefore, overlapped wirings in two layers are formed by the first conductive portions a2 and the second connection lines L2.

In addition, the first edge B5 of the second conductive portion a3 exceeds the third edge B7 of the first connection line L1, and the second edge B6 exceeds the fourth edge B8 of the first connection line L1.

Referring to FIG. 19B, the conductive line R is not in contact with and connected to the second connection line L2 in the process of fabricating the jumper structure T, which may further reduce the risk of short circuit between the first connection line L1 and the second connection line L2. As a result, the risk of short circuit between the touch electrodes is reduced.

Figure 20A:
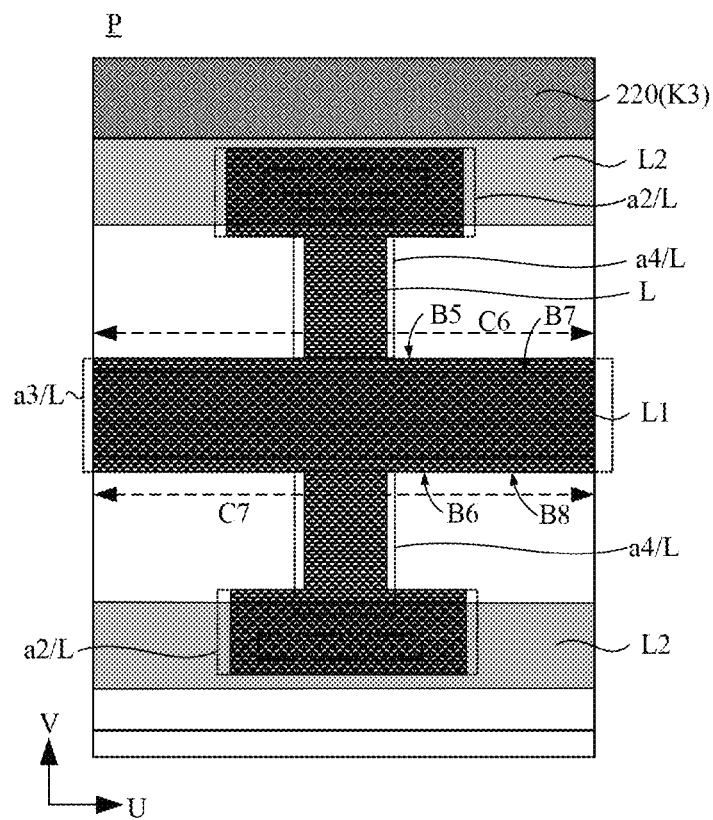
FIGS. 20A and 20B each are a structural diagram of yet another structure, in accordance with some embodiments.
Figure 20B:
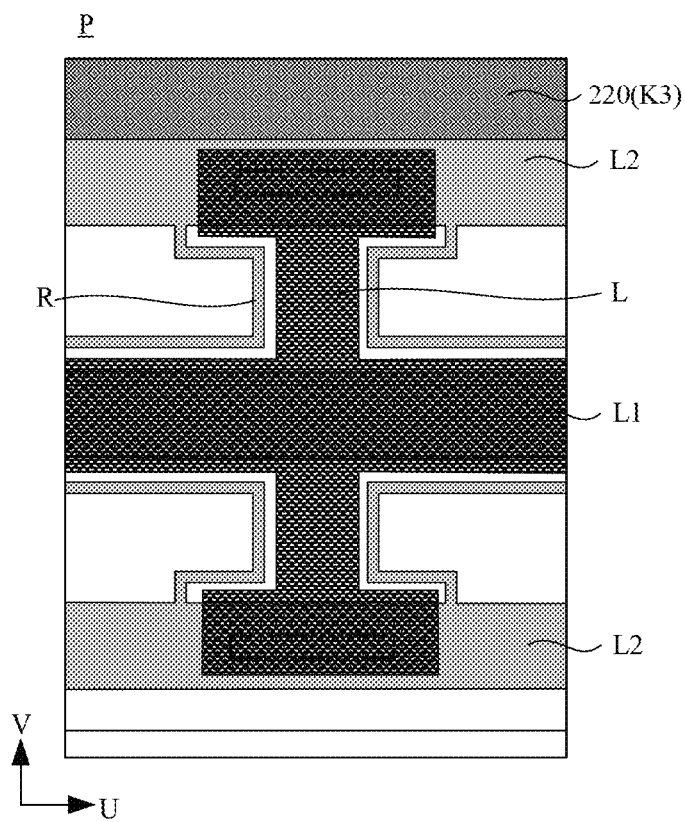

FIGS. 20A and 20B each are a structural diagram of yet another touch structure, in accordance with some embodiments.

As shown in FIG. 20A, the edge B1 of the first conductive portion a2 proximate to the first connection line L1 exceeds the edge B2 of the corresponding second connection line L2 proximate to the first connection line L1.

In addition, the first edge B5 of the second conductive portion a3 exceeds the third edge B7 of the first connection line L1, and the second edge B6 exceeds the fourth edge B8 of the first connection line L1. In the first direction U, the dimension C6 of the second conductive portion a3 is substantially equal to the dimension C7 of the first connection line L1. Therefore, overlapped wirings in two layers are formed by the second conductive portion a3 and the first connection line L1.

Referring to FIG. 20B, the conductive line R is not in contact with and connected to the first connection line L1 in the process of fabricating the jumper structure T, which may further reduce the risk of short circuit between the first connection line L1 and the second connection line L2. As a result, the risk of short circuit between the touch electrodes is reduced.

Figure 21A:
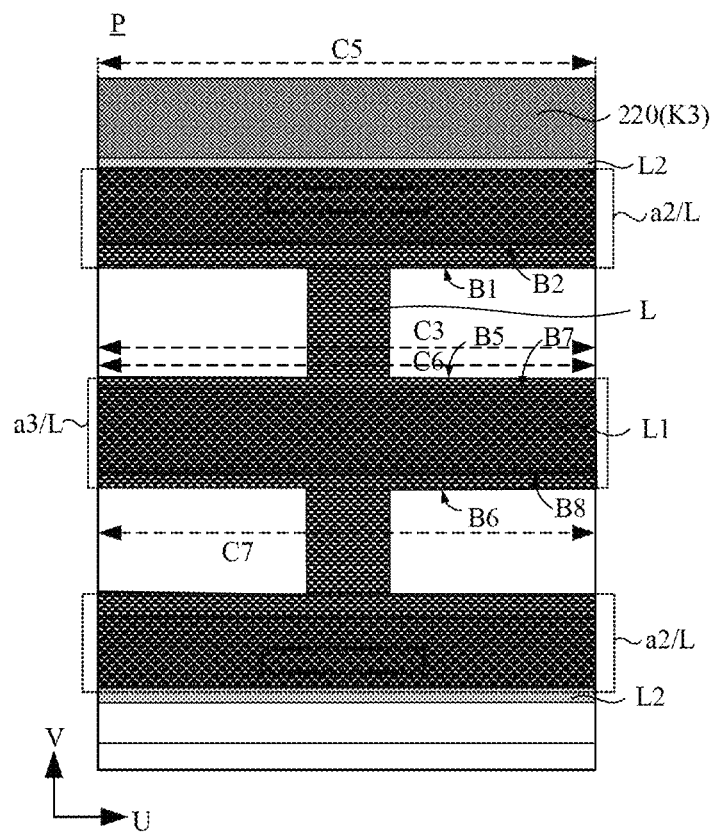
FIGS. 21A and 21B each are a structural diagram of yet another structure, in accordance with some embodiments.
Figure 21B:
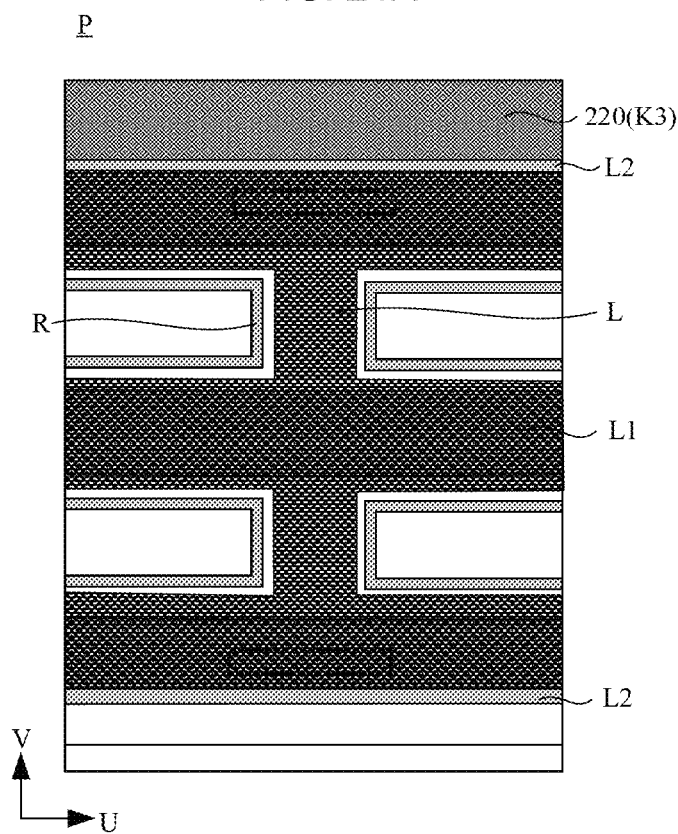

FIGS. 21A and 21B each are a structural diagram of yet another touch structure, in accordance with some embodiments.

In some embodiments, as shown in FIG. 21A, the edge B1 of the first conductive portion a2 proximate to the first connection line L1 exceeds the edge B2 of the corresponding second connection line L2 proximate to the first connection line L1; in the first direction U, the dimensions C3 of the two first conductive portions a2 are substantially equal to the dimensions C5 of respective second connection lines L2. Therefore, overlapped wirings in two layers are formed by the first conductive portions a2 and the second connection lines L2.

In addition, the first edge B5 of the second conductive portion a3 exceeds the third edge B7 of the first connection line L1, and the second edge B6 exceeds the fourth edge B8 of the first connection line L1; in the first direction U, the dimension C6 of the second conductive portion a3 is substantially equal to the dimension C7 of the first connection line L1. Therefore, overlapped wirings in two layers are formed by the second conductive portion a3 and the first connection line L1.

Referring to FIG. 21B, the conductive line R is not in contact with and connected to the first connection line L1 and the second connection line L2 in the process of fabricating the jumper structure T, which may further reduce the risk of short circuit between the first connection line L1 and the second connection line L2. As a result, the risk of short circuit between the touch electrodes is reduced.

In addition, the jumper structure T may also be used in a corner region A2 of the display panel 200. For example, the first connection line L1 in the jumper structure T is connected to two touch lines, or connected to one touch electrode and one touch line. One of the two second connection lines L2 is connected to one touch electrode or one touch line, and the other of the two second connection lines L2 is connected to one touch line. The design of the jumper structure T in the corner region A2 is described below.

Figure 22:
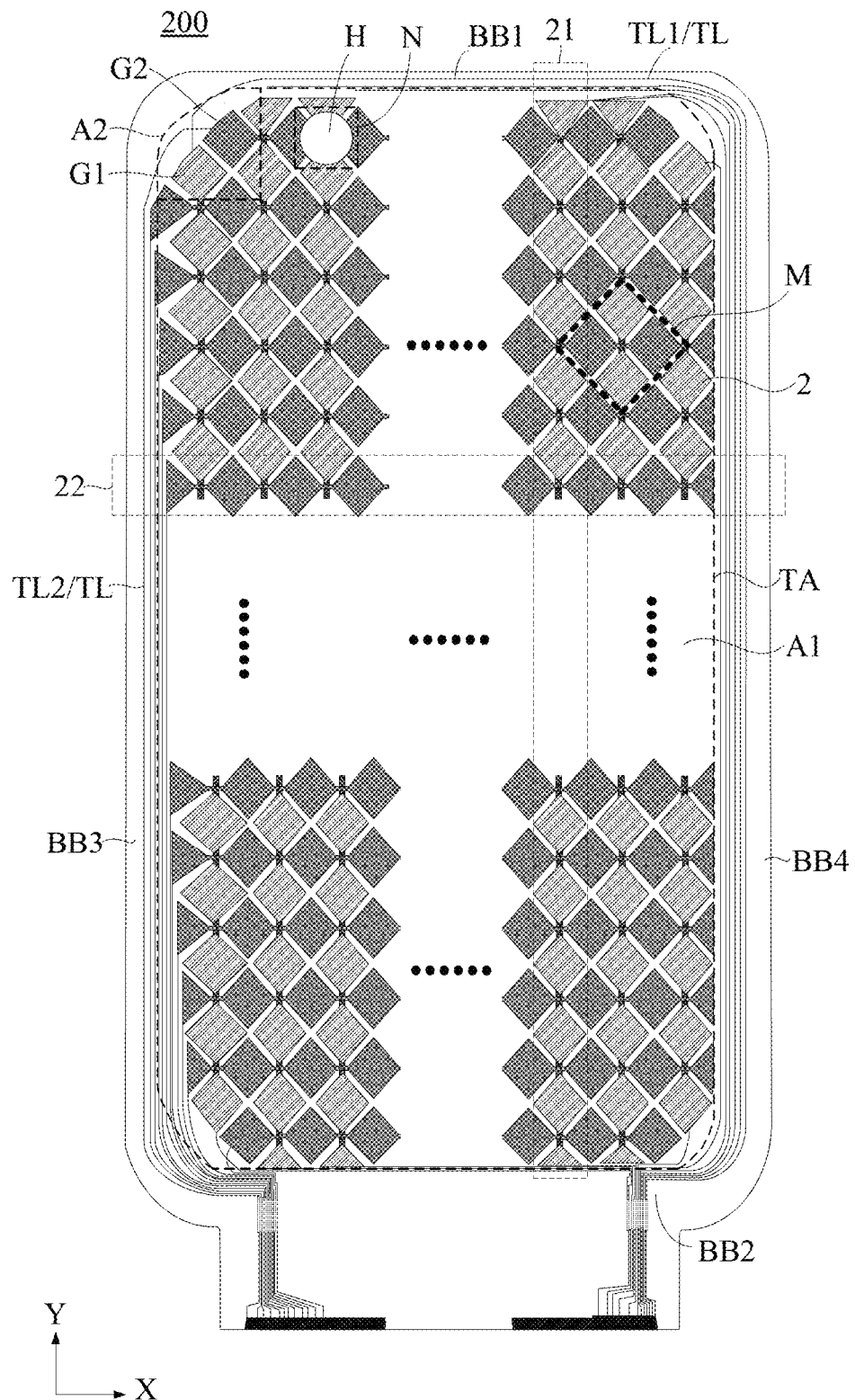
FIG. 22 is a structural diagram of a display panel, in accordance with some embodiments.
Figure 23:
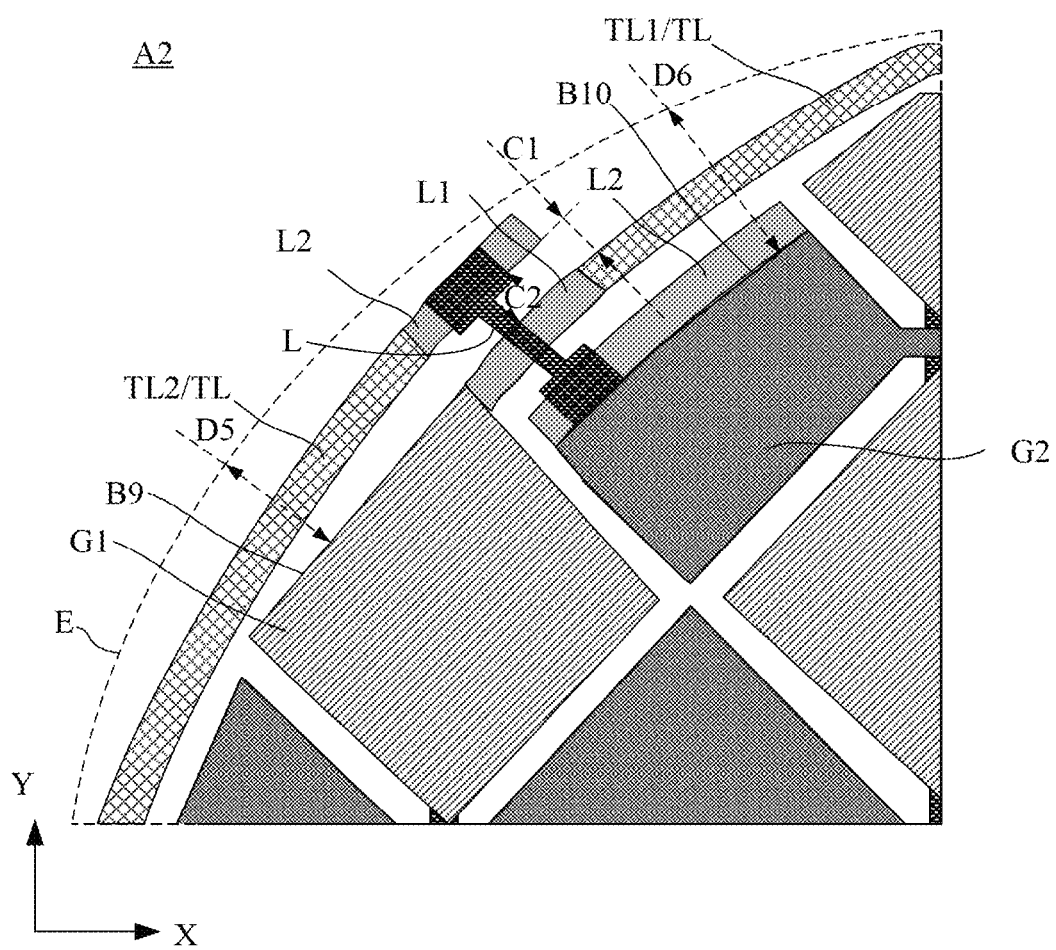
FIG. 23 is a structural diagram of a corner region of the display panel in FIG. 22.
Figure 24:
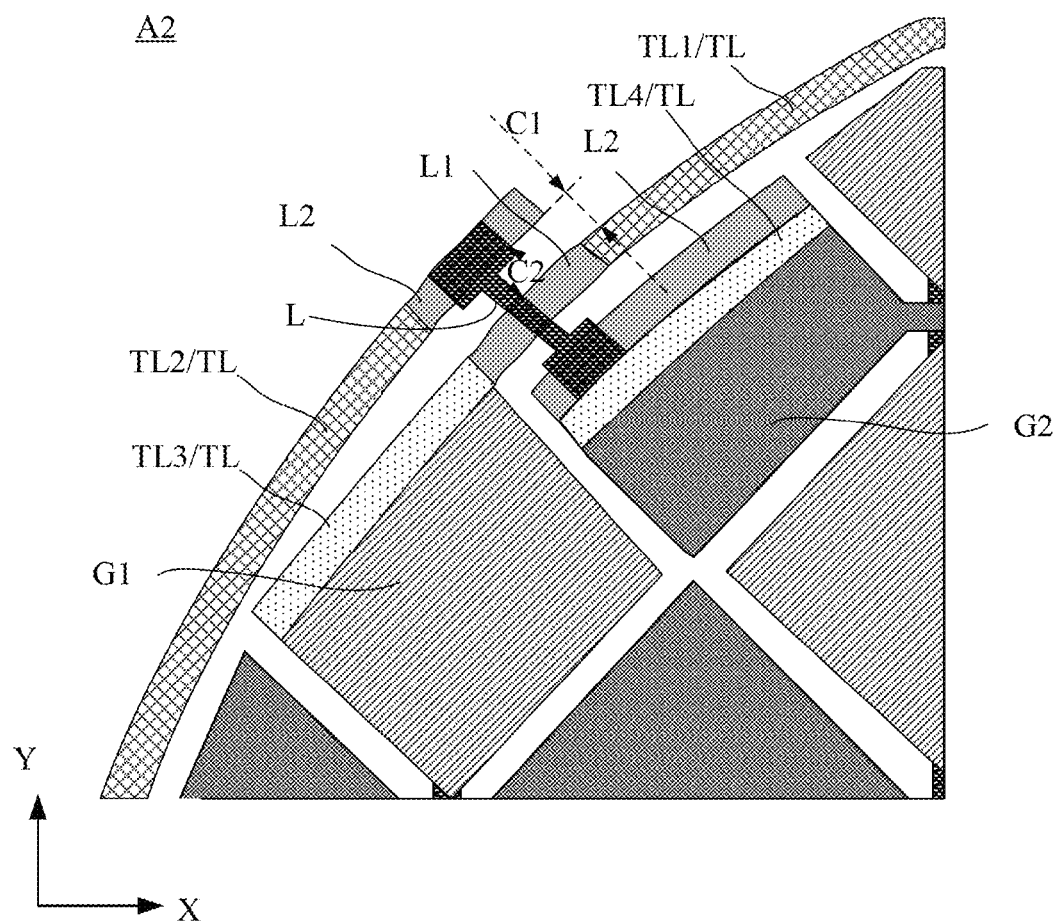
FIG. 24 is another structural diagram of a corner region of the display panel in FIG. 22.
Figure 25:
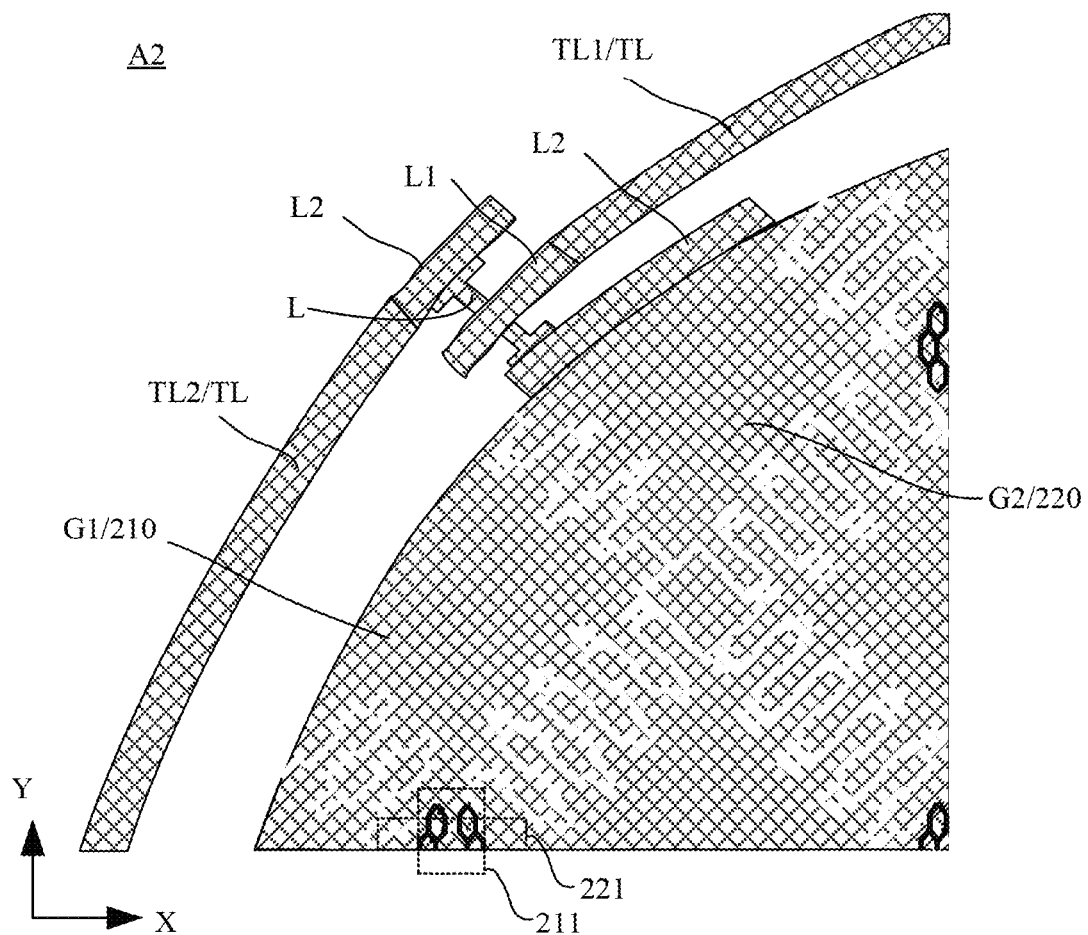
FIG. 25 is yet another structural diagram of a corner region of the display panel in FIG. 22.

FIG. 22 is a structural diagram of the display panel, in accordance with some embodiments; FIG. 23 is a structural diagram of the corner region of the display panel in FIG. 22; FIG. 24 is another structural diagram of the corner region of the display panel in FIG. 22; and FIG. 25 is yet another structural diagram of the corner region of the display panel in FIG. 22.

In some embodiments, as shown in FIG. 22, the touch structure 2 further has: a first wiring region BB1 and a second wiring region BB2 that are located at two opposite sides of the touch region TA in the direction Y, and a third wiring region BB3 and a fourth wiring region BB4 that are located at two opposite sides of the touch region TA in the direction X, all of which are used for arranging a plurality of touch lines TL therein.

The touch lines TL and the touch electrodes are disposed in a same layer, and they are all located in the second conductive layer 2c. The plurality of touch lines TL include a plurality of first touch lines TL1 and a plurality of second touch lines TL2. Each first touch unit 21 is electrically connected to at least one first touch line TL1, and the first touch line TL1 is led out from the first wiring region BB1 and extends to the second wiring region BB2 through the fourth wiring region BB4. Each second touch unit 22 is electrically connected to at least one second touch line TL2, and the second touch line TL2 is led out from the third wiring region BB3 and extends to the second wiring region BB2.

As shown in FIGS. 22 and 23, the corner region A2 is adjacent to the first wiring region BB1 and the third wiring region BB3. A first touch unit 21 in the plurality of first touch units 21 closest to the third wiring region BB3 includes a first corner touch electrode G1, and the first corner touch electrode G1 is located in the corner region A2. A second touch unit 22 in the plurality of second touch units 22 closest to the first wiring region BB1 includes a second corner touch electrode G2, and the second corner touch electrode G2 is located in the corner region A2.

The first connection line L1 in the jumper structure T is connected to the first corner touch electrode G1 and the first touch line TL1. One of the two second connection lines L2 is connected to the second corner touch electrode G2, and the other one of the two second connection lines L2 is connected to the second touch line TL2, the connection pattern L crosses the first connection line L1, and two ends of the connection pattern L pass through the insulating layer 2b to be connected to the two second connection lines L2, respectively, so that a normal connection between the second corner touch electrode G2 and the second touch line TL2 is realized.

It will be understood that, what is the same as the jumper structure T around the installation hole H is that, referring to FIG. 23, for the jumper structure T in the corner region A2, the distance between the first connection line L1 and the second connection line L2 is the first dimension C1. For the portion of the connection pattern L located between the first connection line L1 and the second connection line L2, the length of the contour from the first connection line L1 to the second connection line L2 is the second dimension C2, and the second dimension C2 is greater than the first dimension C1.

In the process of fabricating the jumper structure T, as the length C2 of the contour of the portion of the connection pattern L increases, the length of the conductive line R increases. Thus, a disconnection is easily happened to the conductive line R, which reduces the risk that the conductive line R is connected to the first connection line L1 and the second connection line L2, and thus reduces the risk of short circuit between the touch electrodes.

In addition, the designs of the jumper structure T around the installation hole H described in the embodiments are also applicable to the jumper structure in the corner region A2, and details will not be repeated here.

In some embodiments, as shown in FIG. 24, the plurality of touch lines TL further include a third touch line TL3 and a fourth touch line TL4.

The first connection line L1 in the jumper structure T is connected to the first touch line TL1 and the third touch line TL3, and the third touch line TL3 is connected to the first corner touch electrode G1. One of the two second connection lines L2 is connected to the second touch line TL2, and the other one of the two second connection lines L2 is connected to the fourth touch line TL4; the fourth touch line TL4 is connected to the second corner touch electrode G2. The connection pattern L crosses the first connection line L1, and two ends of the connection pattern L pass through the insulating layer 2b to be connected to the two second connection lines L2, respectively, so that a normal connection between the second corner touch electrode G2 and the second touch line TL2 is achieved.

In some embodiments, as shown in FIG. 23, the first connection line L1 and the second connection lines L2 are disposed along an outer edge E of the corner region A2, and the length extending direction of the connection pattern L passes the corner region A2.

As shown in FIG. 23, the first corner touch electrode G1 includes a fifth edge B9 proximate to the outer edge E of the corner region A2, and the second corner touch electrode G2 includes a sixth edge B10 proximate to the outer edge E of the corner region A2. A distance D5 between the fifth edge B9 and the outer edge E of the corner region A2 is less than a distance D6 between the sixth edge B10 and the outer edge E of the corner region A2. A distance between the outer edge E of the corner region A2 and the second connection line L2 connected to the second corner touch electrode G2, a distance between the outer edge E of the corner region A2 and the first connection line L1, and a distance between the outer edge E of the corner region A2 and the second connection line L2 connected to the second touch line TL2 are sequentially decreased.

In some embodiments, as shown in FIG. 25, the first connection line L1, the second connection lines L2 and the connection pattern L in the jumper structure T each include a metal mesh structure. The metal mesh structure has small resistance and high sensitivity, which may improve the transmission efficiency of signals on the first connection line L1, the second connection lines L2 and the connection pattern L, and thus help improve the touch performance of the touch structure 2. In addition, the metal mesh structure has high mechanical strength and light weight, which helps reduce the weight of the touch structure 2.

It will be understood that, first touch electrodes 210, second touch electrodes 220, the first connection bridge 211, and the second connection bridge 221 in the touch structure 2 may also each include a metal mesh structure.

For the jumper structure Y provided in the embodiments of the present disclosure, the length C2 of the contour of the portion of the connection pattern L located between the first connection line L1 and the second connection line L2 is greater than the distance C1 between the first connection line L1 and the second connection line L2. Compared with the jumper structure in the related art, the length C2 of the contour of the portion of the connection pattern L located between the first connection line L1 and the second connection line L2 is increased.

Thus, in the process of fabricating the jumper structure T, as the length C2 of the contour of the portion of the connection pattern L increases, the length of the conductive line R increases. Thus, a disconnection is easily happened to the conductive line R, which reduces the risk that the conductive line R is connected to the first connection line L1 and the second connection line L2 is reduced, and thus reduce the risk of short circuit between the touch electrodes.

The touch structure 2, the display panel 200 and the display apparatus 100 provided in the embodiments of the present disclosure each include the jumper structure T provided in any one of the embodiments above, and thus beneficial effects that can be achieved thereby can refer to the beneficial effects of the jumper structure T above, which will not be repeated here.

The foregoing descriptions are merely specific implementations of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. A touch structure, comprising: a first conductive layer, an insulating layer and a second conductive layer that are stacked in sequence, wherein the second conductive layer is located above the first conductive layer, and the second conductive layer includes a plurality of touch electrodes and a plurality of touch lines;

the touch structure comprises at least one jumper structure, and a jumper structure in the at least one jumper structure includes: a first connection line, two second connection lines and at least one connection pattern; the first connection line and the two second connection lines are located in the second conductive layer, and the at least one connection pattern is located in the first conductive layer; the first connection line and the two second connection lines are arranged in parallel and at intervals, and the two second connection lines are arranged at two sides of the first connection line, respectively; a connection pattern in the at least one connection pattern crosses the first connection line, and two ends of the connection pattern pass through the insulating layer to be connected to the two second connection lines, respectively;

a distance between the first connection line and a second connection line in the two second connection lines is a first dimension; for a portion of the connection pattern located between the first connection line and the second connection line, a length of a contour from the first connection line to the second connection line is a second dimension; and the second dimension is greater than the first dimension.

2. The touch structure according to claim 1, wherein the connection pattern includes a first connection portion and two first conductive portions disposed at two ends of the first connection portion; in a first direction, dimensions of the two first conductive portions are greater than a dimension of the first connection portion; and the first direction is substantially parallel to an extending direction of the first connection line;

the first connection portion crosses the first connection line; the two first conductive portions correspond to the two second connection lines, respectively, and each first conductive portion passes through the insulating layer to be connected to a corresponding second connection line; and an edge of the first conductive portion proximate to the first connection line exceeds an edge of the corresponding second connection line proximate to the first connection line.

3. The touch structure according to claim 2, wherein in the first direction, a dimension of a first conductive portion in at least one first conductive portion is substantially equal to a dimension of a corresponding second connection line; and/or an edge of a first conductive portion in at least one first conductive portion proximate to the first connection line is substantially parallel to an edge of a corresponding second connection line proximate to the first connection line.

4. The touch structure according to claim 2, wherein an average distance between an edge of a first conductive portion in at least one first conductive portion proximate to the first connection line and an edge of a corresponding second connection line proximate to the first connection line is D;
- a dimensional tolerance of the first conductive portion in a second direction is $CD_1$, and the second direction is substantially perpendicular to the extending direction of the first connection line;
- a positional tolerance of the first conductive portion is $OL_1$;
- a dimensional tolerance of the corresponding second connection line in the second direction is $CD_2$; and
- a positional tolerance of the corresponding second connection line is $OL_2$, wherein $$D > \frac{CD_1}{2} + OL_1 + \frac{CD_2}{2} + OL_2; \text{ or}$$
$$D > \sqrt{\left(\frac{CD_1}{2}\right)^2 + OL_1^2 + \left(\frac{CD_2}{2}\right)^2 + OL_2^2}.$$

5. The touch structure according to claim 2, wherein an edge of a first conductive portion in at least one first conductive portion away from the first connection line exceeds an edge of a corresponding second connection line away from the first connection line.

6. The touch structure according to claim 1, wherein the connection pattern includes a second conductive portion, an orthographic projection of the first connection line on a reference plane overlaps with an orthographic projection of the second conductive portion on the reference plane, and the reference plane is a plane in which the first conductive layer is located;
- two opposite edges of the second conductive portion in a second direction are a first edge and a second edge, and two opposite edges of the first connection line in the second direction are a third edge and a fourth edge; the first edge corresponds to the third edge, and the first edge exceeds the third edge; the second edge corresponds to the fourth edge, and the second edge exceeds the fourth edge; and the second direction is substantially perpendicular to an extending direction of the first connection line.

7. The touch structure according to claim 6, wherein in a first direction, a dimension of the second conductive portion is substantially equal to a dimension of the first connection line, and the first direction is substantially parallel to the extending direction of the first connection line.

8. The touch structure according to claim 6, wherein the first edge is substantially parallel to the third edge; and/or the second edge is substantially parallel to the fourth edge.

9. The touch structure according to claim 6, wherein the connection pattern further includes: two first conductive portions and two second connection portions, a first conductive portion in the two first conductive portions is connected to the second conductive portion through a second connection portion in the two second connection portions, and the second conductive portion is connected to another first conductive portion in the two first conductive portions through another second connection portion in the two second connection portions; or
the connection pattern further includes two first conductive portions and two second connection portions, the first conductive portion is connected to the second conductive portion through the second connection portion, and the second conductive portion is connected to the another first conductive portion through the another second connection portion; and
the second conductive portion and the two second connection portions constitute a crossover portion, the crossover portion crosses the first connection line, and the two first conductive portions pass through the insulating layer to be connected to respective second connection lines.

10. The touch structure according to claim 1, further comprising an installation hole penetrating the touch structure, wherein
the plurality of touch electrodes include a plurality of first touch electrodes and a plurality of second touch electrodes;
the touch structure has a plurality of first touch units and a plurality of second touch units; a first touch unit in the plurality of first touch units includes first touch electrodes that are arranged along a third direction and connected, and a second touch unit in the plurality of second touch units includes second touch electrodes that are arranged along a fourth direction and connected; the third direction intersects the fourth direction;
the plurality of first touch electrodes include at least one first electrode and at least one second electrode that are located at a periphery of the installation hole, and the plurality of second touch electrodes include at least one third electrode and at least one fourth electrode that are located at the periphery of the installation hole;
the jumper structure is disposed around the installation hole; the first connection line is connected to a first electrode and a second electrode that belong to a same first touch unit; one of the two second connection lines is connected to a third electrode, and another one of the two second connection lines is connected to a fourth electrode, and the third electrode and the fourth electrode belong to a same second touch unit.

11. The touch structure according to claim 10, wherein the at least one jumper structure includes a plurality of jumper structures around the installation hole;
the first touch unit includes the first electrode and the second electrode that are located at the periphery of the installation hole, and the first connection line is connected to the first electrode and the second electrode;
the second touch unit includes the third electrode and the fourth electrode that are located at the periphery of the installation hole, one of the two second connection lines is a first target lead, and another one of the two second connection lines is a second target lead; and the first target lead includes a first line segment and a second line segment that are arranged separately;
the third electrode is connected to the first line segment, and the fourth electrode is connected to the second line segment; the at least one connection pattern includes a plurality of connection patterns, a connection pattern in the plurality of connection patterns crosses the first connection line in the jumper structure, an end of the connection pattern is connected to the first line segment, and another end of the connection pattern is connected to the second target lead; another connection pattern in the plurality of connection patterns crosses a first connection line in another jumper structure in the plurality of jumper structures, an end of the another connection pattern is connected to the second target lead, and another end of the another connection pattern is connected to the second line segment.

12. The touch structure according to claim 11, wherein the first connection line and the two second connection lines are disposed along an edge of the installation hole; length extending directions of the plurality of connection patterns pass the installation hole;
a distance between the installation hole and an edge of the first electrode proximate to the installation hole is less than a distance between the installation hole and an edge of the third electrode proximate to the installation hole, and is less than a distance between the installation hole and an edge of the fourth electrode proximate to the installation hole;
a distance between the installation hole and an edge of the second electrode proximate to the installation hole is less than the distance between the installation hole and the edge of the third electrode proximate to the installation hole, and is less than the distance between the installation hole and the edge of the fourth electrode proximate to the installation hole; and
a distance between the installation hole and the first line segment, a distance between the installation hole and the first connection line, and a distance between the installation hole and the second target lead are sequentially decreased; and a distance between the installation hole and the second line segment, a distance between the installation hole and the first connection line in the another jumper structure, and a distance between the installation hole and the second target lead are sequentially decreased.

13. The touch structure according to claim 11, wherein the plurality of first touch electrodes further include at least one fifth electrode located at the periphery of the installation hole, a fifth electrode in the at least one fifth electrode is located between the first electrode and the second electrode in the third direction, and the fifth electrode is connected to the first connection line;
the plurality of second touch electrodes further include at least one sixth electrode located at the periphery of the installation hole, a sixth electrode in the at least one sixth electrode is located between the third electrode and the fourth electrode in the fourth direction, and the sixth electrode is connected to the second target lead.

14. The touch structure according to claim 10, wherein areas of the first electrode, the second electrode, the third electrode and the fourth electrode are all less than an area of a touch electrode that is not penetrated by the installation hole;
the plurality of first touch electrodes further include at least one fifth electrode located at the periphery of the installation hole; an area of a fifth electrode in the at least one fifth electrode is less than an area of the first electrode, and is less than an area of the second electrode;
the plurality of second touch electrodes further include at least one sixth electrode located at the periphery of the installation hole; an area of a sixth electrode in the at least one sixth electrode is less than an area of the third electrode, and is less than an area of the fourth electrode.

15. The touch structure according to claim 1, further comprising: a touch region, a first wiring region and a second wiring region that are located on two opposite sides of the touch region in a first direction, and a third wiring region and a fourth wiring region that are located on two opposite sides of the touch region in the second direction;
the plurality of touch electrodes include a plurality of first touch electrodes and a plurality of second touch electrodes;
the touch structure has a plurality of first touch units and a plurality of second touch units; a first touch unit in the plurality of first touch units includes first touch electrodes that are arranged along a third direction and connected, and a second touch unit in the plurality of second touch units includes second touch electrodes that are arranged along a fourth direction and connected; the third direction intersects the fourth direction;
the plurality of touch lines include a plurality of first touch lines and a plurality of second touch lines; each first touch unit is electrically connected to at least one first touch line, and a first touch line in the at least one first touch line is led out from the first wiring region and extends to the second wiring region through the fourth wiring region;
each second touch unit is electrically connected to at least one second touch line, and a second touch line in the at least one second touch line is led out from the third wiring region and extends to the second wiring region;
the touch region includes a corner region adjacent to the first wiring region and the third wiring region; a first touch unit in the plurality of first touch units closest to the third wiring region includes a first corner touch electrode located in the corner region, and a second touch unit in the plurality of second touch units closest to the first wiring region includes a second corner touch electrode located in the corner region; and
the first connection line is connected to the first corner touch electrode and the first touch line; one of the two second connection lines is connected to the second corner touch electrode, and another one of the two second connection lines is connected to the second touch line.

16. The touch structure according to claim 15, wherein the first connection line and the second connection lines are disposed along an outer edge of the corner region; a length extending direction of the connection pattern passes the corner region;
the first corner touch electrode includes a fifth edge proximate to the outer edge of the corner region, and the second corner touch electrode includes a sixth edge proximate to the outer edge of the corner region; a distance between the fifth edge and the outer edge of the corner region is less than a distance between the sixth edge and the outer edge of the corner region; and
a distance between the outer edge of the corner region and the second connection line connected to the second corner touch electrode, a distance between the outer edge of the corner region and the first connection line, and a distance between the outer edge of the corner region and the second connection line connected to the second touch line are sequentially decreased.

17. The touch structure according to claim 1, wherein the first connection line, the second connection line and the connection pattern each include a metal mesh structure.

18. A display panel, comprising:
a display substrate;
the touch structure according to claim 1, wherein the touch structure is disposed on a light exit side of the display substrate.

19. A display apparatus, comprising the display panel according to claim 18.

20. The touch structure according to claim 1, further comprising: a touch region, a first wiring region and a second wiring region that are located on two opposite sides of the touch region in a first direction, and a third wiring region and a fourth wiring region that are located on two opposite sides of the touch region in the second direction;

the plurality of touch electrodes include a plurality of first touch electrodes and a plurality of second touch electrodes;

the touch structure has a plurality of first touch units and a plurality of second touch units; a first touch unit in the plurality of first touch units includes first touch electrodes that are arranged along a third direction and connected, and a second touch unit in the plurality of second touch units includes second touch electrodes that are arranged along a fourth direction and connected; the third direction intersects the fourth direction;

the plurality of touch lines include a plurality of first touch lines and a plurality of second touch lines; each first touch unit is electrically connected to at least one first touch line, and a first touch line in the at least one first touch line is led out from the first wiring region and extends to the second wiring region through the fourth wiring region;

each second touch unit is electrically connected to at least one second touch line, and a second touch line in the at least one second touch line is led out from the third wiring region and extends to the second wiring region;

the touch region includes a corner region adjacent to the first wiring region and the third wiring region; a first touch unit in the plurality of first touch units closest to the third wiring region includes a first corner touch electrode located in the corner region, and a second touch unit in the plurality of second touch units closest to the first wiring region includes a second corner touch electrode located in the corner region; and the plurality of touch lines further include a third touch line and a fourth touch line, the third touch line is connected to the first corner touch electrode, and the fourth touch line is connected to the second corner touch electrode; the first connection line is connected to the first touch line and the third touch line; one of the two second connection lines is connected to the second touch line, and another one of the two second connection lines is connected to the fourth touch line.

* * * * *